United States Patent
Ye et al.

(10) Patent No.: US 11,972,113 B2
(45) Date of Patent: Apr. 30, 2024

(54) METHOD AND APPARATUS FOR PERFORMING LINK MANAGEMENT OF MEMORY DEVICE IN PREDETERMINED COMMUNICATIONS ARCHITECTURE WITH AID OF HANDSHAKING PHASE TRANSITION CONTROL

(71) Applicant: Silicon Motion, Inc., Hsinchu County (TW)

(72) Inventors: Bo-Chang Ye, Kaohsiung (TW); Kuo-Cyuan Kuo, Hsinchu County (TW); Chih-Chiang Chen, Taichung (TW)

(73) Assignee: Silicon Motion, Inc., Hsinchu County (TW)

( * ) Notice: Subject to any disclaimer, the term of this patent is extended or adjusted under 35 U.S.C. 154(b) by 102 days.

(21) Appl. No.: 17/874,270

(22) Filed: Jul. 26, 2022

(65) Prior Publication Data

US 2024/0036738 A1     Feb. 1, 2024

(51) Int. Cl.
*G06F 3/06*     (2006.01)

(52) U.S. Cl.
CPC .......... *G06F 3/0617* (2013.01); *G06F 3/0635* (2013.01); *G06F 3/0679* (2013.01)

(58) Field of Classification Search
CPC ..... G06F 3/0617; G06F 3/0635; G06F 3/0679
See application file for complete search history.

(56) References Cited

U.S. PATENT DOCUMENTS

| | | | |
|---|---|---|---|
| 8,898,532 B2 * | 11/2014 | Trainin | H04L 1/1621 714/748 |
| 2009/0154467 A1 * | 6/2009 | Diab | H04L 12/4013 370/395.4 |
| 2013/0262810 A1 | 10/2013 | Chang | |
| 2014/0298111 A1 * | 10/2014 | Glickman | H03M 13/00 714/47.2 |
| 2016/0224493 A1 * | 8/2016 | Wang | G06F 13/24 |
| 2018/0253394 A1 * | 9/2018 | Park | G06F 13/4234 |
| 2018/0300282 A1 * | 10/2018 | Vertenten | G06F 13/4282 |
| 2021/0219214 A1 * | 7/2021 | Andonieh | H04L 1/1642 |
| 2022/0197836 A1 | 6/2022 | Li | |
| 2022/0283624 A1 * | 9/2022 | Bajpai | G06F 1/3253 |

FOREIGN PATENT DOCUMENTS

| | | |
|---|---|---|
| TW | 201933168 A | 8/2019 |
| TW | 202209843 A | 3/2022 |

\* cited by examiner

*Primary Examiner* — Tasnima Matin
(74) *Attorney, Agent, or Firm* — Winston Hsu

(57) ABSTRACT

A method for performing link management of a memory device in predetermined communications architecture with aid of handshaking phase transition control and associated apparatus are provided. The method may include: utilizing at least one upper layer controller of a transmission interface circuit to turn on a physical layer (PHY) circuit of the transmission interface circuit, for starting establishing a link between a host device and the memory device; before entering a first handshaking phase, utilizing the PHY circuit to receive any first incoming data sent from the host device to determine whether the any first incoming data indicates that the host device is in a corresponding first handshaking phase; and in response to the any first incoming data indicating that the host device is in the corresponding first handshaking phase, utilizing the PHY circuit to send first outgoing data that is equal to first predetermined data to the host device.

18 Claims, 10 Drawing Sheets

METHOD AND APPARATUS FOR PERFORMING LINK MANAGEMENT OF MEMORY DEVICE IN PREDETERMINED COMMUNICATIONS ARCHITECTURE WITH AID OF HANDSHAKING PHASE TRANSITION CONTROL

BACKGROUND OF THE INVENTION

1. Field of the Invention

The present invention is related to memory control, and more particularly, to a method and apparatus for performing link management of a memory device in a predetermined communications architecture with aid of handshaking phase transition control.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. When a manufacture tries to enhance some features of the memory device according to Mobile Industry Processor Interface (MIPI) UniPro specification, some problems may occur. More particularly, a host device coupled to the memory device may try to establish a link between the host device and the memory device, but in some situations, a handshaking operation for establishing the link may get stuck (e.g., due to the host device or some other reasons), causing failure of establishing the link between the host device and the memory device. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing link management of a memory device in a predetermined communications architecture (e.g., a MIPI UniPro communications architecture) with aid of handshaking phase transition control, in order to solve the above-mentioned problems.

At least one embodiment of the present invention provides a method for performing link management of a memory device in a predetermined communications architecture with aid of handshaking phase transition control, the method can be applied to a memory controller of the memory device. The memory device may comprise the memory controller and a non-volatile (NV) memory, and the NV memory may comprise at least one NV memory element (e.g., one or more NV memory elements). The method may comprise: utilizing at least one upper layer controller of a transmission interface circuit within the memory controller to turn on a physical layer (PHY) circuit of the transmission interface circuit, for starting establishing a link between a host device and the memory device; before entering a first handshaking phase of a handshaking procedure of the memory device, the handshaking procedure for establishing the link between the host device and the memory device, utilizing the PHY circuit to receive any first incoming data sent from the host device to determine whether the any first incoming data indicates that the host device is in a corresponding first handshaking phase, and prevent sending any outgoing data that is equal to first predetermined data of the first handshaking phase to the host device before detecting that the host device is in the corresponding first handshaking phase, wherein the first handshaking phase is not earliest among multiple handshaking phases of the handshaking procedure; and in response to the any first incoming data indicating that the host device is in the corresponding first handshaking phase, utilizing the PHY circuit to send first outgoing data that is equal to the first predetermined data to the host device.

In addition to the above method, the present invention also provides a memory device, and the memory device comprises a NV memory and a memory controller. The NV memory is arranged to store information, wherein the NV memory may comprise at least one NV memory element (e.g., one or more NV memory elements). The memory controller is coupled to the NV memory, and the memory controller is arranged to control operations of the memory device. In addition, the memory controller comprises a processing circuit that is arranged to control the memory controller according to a plurality of host commands from a host device, to allow the host device to access the NV memory through the memory controller. The memory controller further comprises a transmission interface circuit, and the transmission interface circuit is arranged to perform communications with the host device, and more particularly, comprises a physical layer (PHY) circuit and at least one upper layer controller. The PHY circuit is arranged to perform transmitting and receiving operations for the transmission interface circuit. The at least one upper layer controller is arranged to control operations of the PHY circuit according to a predetermined specification. For example, the memory controller utilizes the at least one upper layer controller to turn on the PHY circuit, for starting establishing a link between the host device and the memory device; before entering a first handshaking phase of a handshaking procedure of the memory device, the handshaking procedure for establishing the link between the host device and the memory device, the memory controller utilizes the PHY circuit to receive any first incoming data sent from the host device to determine whether the any first incoming data indicates that the host device is in a corresponding first handshaking phase, and prevent sending any outgoing data that is equal to first predetermined data of the first handshaking phase to the host device before detecting that the host device is in the corresponding first handshaking phase, wherein the first handshaking phase is not earliest among multiple handshaking phases of the handshaking procedure; and in response to the any first incoming data indicating that the host device is in the corresponding first handshaking phase, the memory controller utilizes the PHY circuit to send first outgoing data that is equal to the first predetermined data to the host device.

According to some embodiments, an associated electronic device is also provided. The electronic device may comprise the memory device mentioned above, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a memory controller of a memory device, where the memory device comprises the memory controller and a NV memory. The NV memory may comprise at least one NV memory element (e.g., one or more NV memory elements). In addition, the memory controller comprises a processing circuit that is arranged to control the memory controller according to a plurality of host commands from a host device, to allow the host device to access the NV memory through the memory controller. The memory controller further comprises a transmission interface circuit, and the transmission interface circuit is arranged to perform communications with the host device, and more particularly, comprises a physical layer (PHY) circuit and at least one upper layer controller. The PHY circuit is arranged to perform transmitting and receiving operations for the transmission interface circuit. The at least one upper layer controller is arranged to control operations of the PHY circuit according to a predetermined specification. For example, the memory controller utilizes the at least one upper layer controller to turn on the PHY circuit, for starting establishing a link between the host device and the memory device; before entering a first handshaking phase of a handshaking procedure of the memory device, the handshaking procedure for establishing the link between the host device and the memory device, the memory controller utilizes the PHY circuit to receive any first incoming data sent from the host device to determine whether the any first incoming data indicates that the host device is in a corresponding first handshaking phase, and prevent sending any outgoing data that is equal to first predetermined data of the first handshaking phase to the host device before detecting that the host device is in the corresponding first handshaking phase, wherein the first handshaking phase is not earliest among multiple handshaking phases of the handshaking procedure; and in response to the any first incoming data indicating that the host device is in the corresponding first handshaking phase, the memory controller utilizes the PHY circuit to send first outgoing data that is equal to the first predetermined data to the host device.

The present invention method and apparatus can guarantee that the memory device can operate properly in various situations. For example, the memory device (e.g., the memory controller) can control the PHY circuit to wait for a handshaking phase transition of the host device (e.g., the transition from the current handshaking phase of the handshaking procedure of the host device to the next handshaking phase of the handshaking procedure of the host device) and then perform a corresponding handshaking phase transition of the memory device (e.g., the transition from the current handshaking phase of the handshaking procedure of the memory device to the next handshaking phase of the handshaking procedure of the memory device), to prevent any handshaking operation for establishing the link from getting stuck (e.g., due to the host device or some other reasons), and therefore can guarantee the establishment of the link between the host device and the memory device to be successful. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
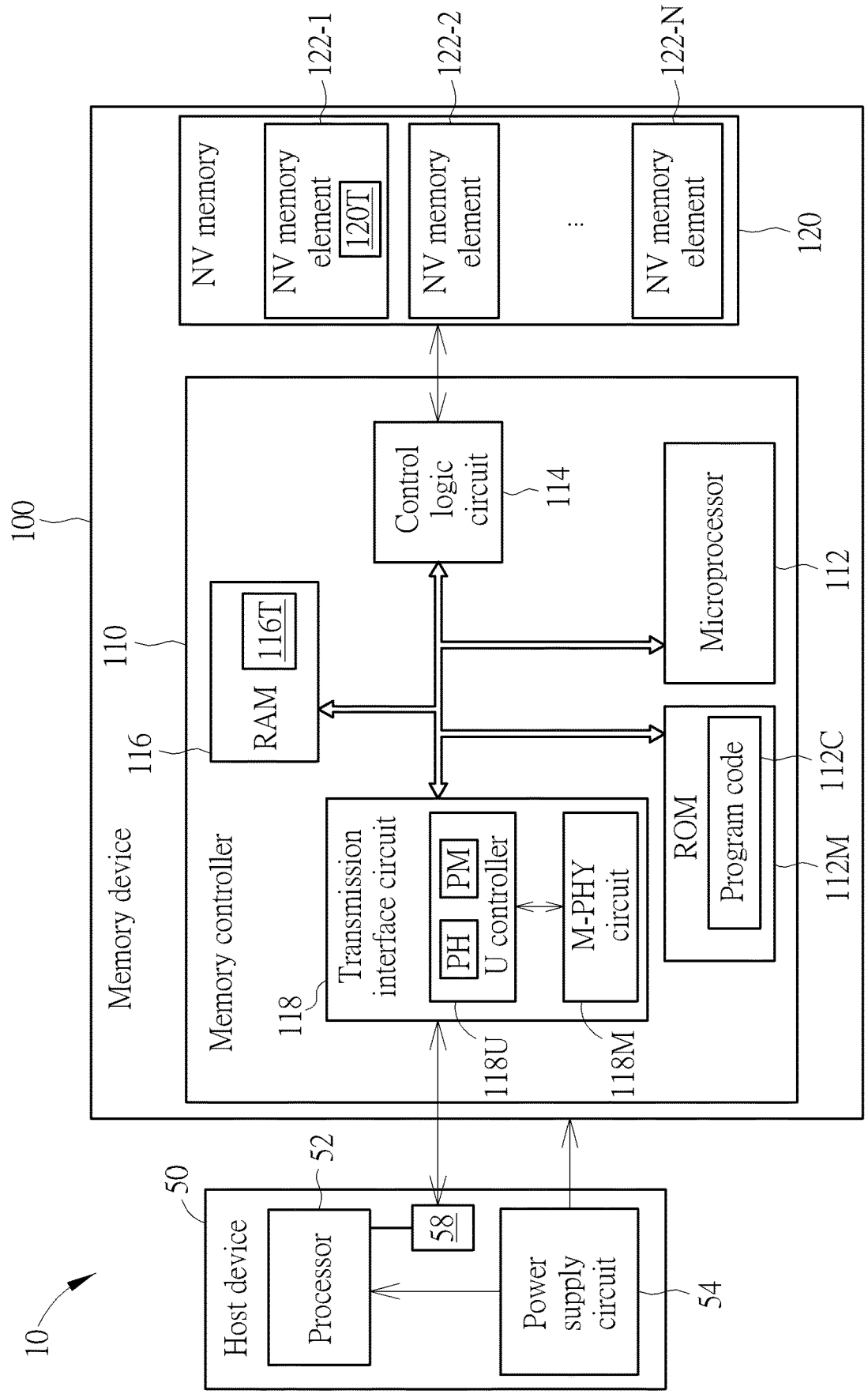
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the memory controller 110 is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of SRAM, for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specifications for the host device 50. For example, the multiple sub-circuits of the transmission interface circuit 118 may comprise a physical layer (PHY) circuit such as an M-PHY circuit 118M (e.g., a MIPI M-PHY circuit), and at least one upper layer controller (e.g., one or more upper layer controllers) which may be collectively referred to as the upper layer controller 118U (labeled "U controller" for brevity), and the transmission interface circuit 58 may be implemented to have a circuitry architecture (e.g., multiple corresponding sub-circuits) similar to or the same as that of the transmission interface circuit 118.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses. The NV memory 120 may store a global L2P address mapping table 120T, for the memory controller 110 to control the memory device 100 to access data in the NV memory 120.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the local L2P address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table 116T which is stored as the temporary L2P address mapping table 116T, but the present invention is not limited thereto.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-*n* (where "n" may represent any integer in the interval [1, N]) within the NV memory elements 122-1, 122-2, . . . , and 122-N, may comprise multiple blocks, and a block within the multiple blocks may comprise and record a specific number of pages, where the memory controller 110 may access a certain page of a certain block within the multiple blocks according to a block address and a page address. For another example, the NV memory element 122-*n* may comprise multiple planes, where a plane may comprise a set of blocks such as the aforementioned multiple blocks, and the memory controller 110 may specify a certain plane within the multiple planes according to a plane number, to access a certain page of a certain block of this plane. As the total number of blocks increases, the storage space of the NV memory 120 may become larger.

Figure 2:
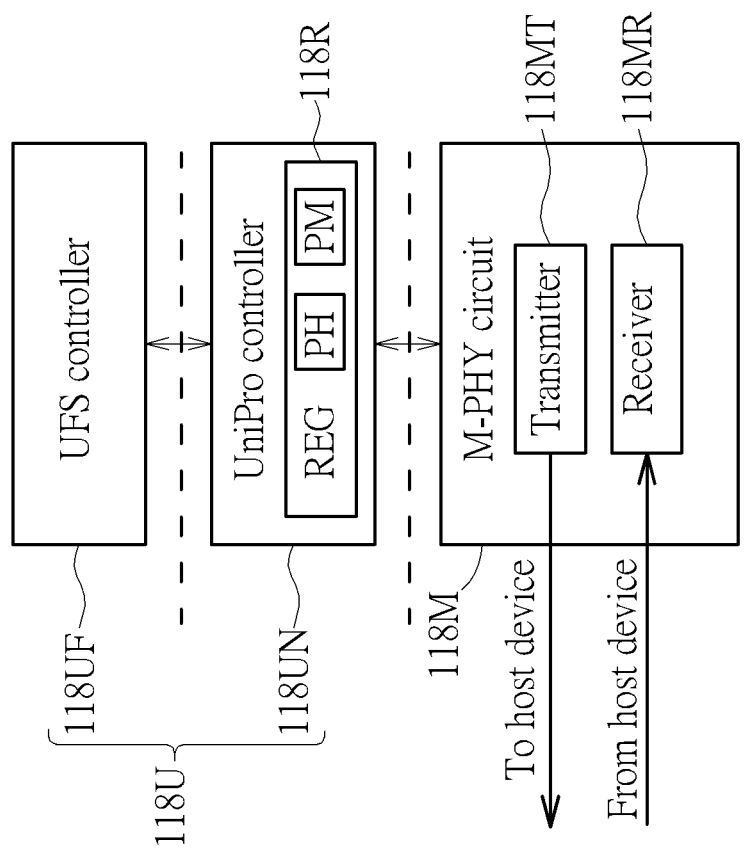
FIG. 2 illustrates a multi-layer control scheme of a method for performing link management of a memory device such as that shown in FIG. 1 in a predetermined communications architecture with aid of handshaking phase transition control according to an embodiment of the present invention.

FIG. 2 illustrates a multi-layer control scheme of a method for performing link management of a memory device such as that shown in FIG. 1 in a predetermined communications architecture (e.g., a MIPI UniPro communications architecture) with aid of handshaking phase transition control according to an embodiment of the present invention. The method can be applied to the architecture shown in FIG. 1, for example, the electronic device 10, the memory device 100, and the memory controller 110, and more particularly, the components within the memory controller 110, such as the microprocessor 112, the transmission interface circuit 118, etc. For better comprehension, the transmission interface circuit 118 may be logically divided into multiple layers, and the physical layer (PHY) of the PHY circuit (e.g., the M-PHY circuit 118M) in the transmission interface circuit 118 may be regarded as a bottom layer. For example, the aforementioned at least one upper layer controller such as the upper layer controller 118U may comprise multiple upper layer controllers respectively corresponding to multiple upper layers, such as a UniPro controller 118UN and a UFS controller 118UF, where the M-PHY circuit 118M may correspond to the bottom layer below the upper layers.

As shown in FIG. 2, the M-PHY circuit 118M may comprise a transmitter 118MT and a receiver 118MR, and the UniPro controller 118UN may comprise a register circuit 118R (labeled "REG" for brevity), where the register circuit 118R may comprise at least one register (e.g., one or more registers), such as a plurality of registers for storing a host-side handshaking phase PH of the host device 50 and a device-side handshaking phase PM of the memory device 100, respectively. For example, the device-side handshaking phase PM may represent the current handshaking phase PHASE_M(i) of the memory device 100 among multiple handshaking phase {PHASE_M(i)} of a handshaking procedure of the memory device 100, and the host-side handshaking phase PH may represent the corresponding handshaking phase PHASE_H(i) of the host device 50 among multiple corresponding handshaking phase {PHASE_H(i)} of a corresponding handshaking procedure of the host device 50, but the present invention is not limited thereto.

The M-PHY circuit 118M may perform operations of the physical layer according to a clock generated by a phase-locked loop (PLL) therein (not shown), and more particularly, may utilize the transmitter 118MT and the receiver 118MR to transmit information such as data, etc. to the host device 50 (e.g., the transmission interface circuit 58) and receive information such as data, etc. from the host device 50 (e.g., the transmission interface circuit 58), respectively. In addition, the UniPro controller 118UN may control operations of the M-PHY circuit 118M according to the MIPI UniPro specification, and more particularly, may monitor the host-side handshaking phase PH (e.g., the handshaking phase PHASE_H(i) of the host device 50) and control the device-side handshaking phase PM (e.g., the handshaking phase PHASE_M(i) of the memory device 100) according to the host-side handshaking phase PH, in order to make the device-side handshaking phase PM be synchronous with the host-side handshaking phase PH. As a result, the electronic device 100 shown in FIG. 1 (e.g., the host device 50 and the memory device 100) can operate properly in various situations. For example, the memory device 100 (e.g., the memory controller 110) can control the M-PHY circuit 118M to wait for a handshaking phase transition of the host device 50 (e.g., the transition from the current handshaking phase PHASE_H(i) of the handshaking procedure of the host device 50 to the next handshaking phase PHASE_H(i+1) of the handshaking procedure of the host device 50) and then perform a corresponding handshaking phase transition of the memory device 100 (e.g., the transition from the current handshaking phase PHASE_M(i) of the handshaking procedure of the memory device 100 to the next handshaking phase PHASE_M(i+1) of the handshaking procedure of the memory device 100), to prevent any handshaking operation for establishing a link between the host device 50 and the memory device 100 from getting stuck (e.g., due to the host device 50 or some other reasons), and therefore can guarantee the establishment of the link between the host device 50 and the memory device 100 to be successful.

Based on the architecture shown in FIG. 2, the present invention method and apparatus can solve the related art problems without introducing any side effect or in a way that is less likely to introduce a side effect.

According to some embodiments, the handshaking phases {PHASE_M(i)|i=0, 1, 2, . . . } of the handshaking procedure at the device side (e.g., the memory device 100) may comprise at least five handshaking phases {PHASE_M(i) |i=0, 1, 2, 3, 4}, for example:

(1) the handshaking phase PHASE_M(0) such as a handshaking phase PMU0, wherein during the handshaking phase PMU0, the memory device 100 can perform at least one handshaking operation according to predetermined data UPR0 (e.g., the predetermined data TRG_UPR0 as defined in the MIPI UniPro specification) of the handshaking phase PMU0 at the device side;

(2) the handshaking phase PHASE_M(1) such as a handshaking phase PMU1, wherein during the handshaking phase PMU1, the memory device 100 can perform at least one handshaking operation according to predetermined data UPR1 (e.g., the predetermined data TRG_UPR1 as defined in the MIPI UniPro specification) of the handshaking phase PMU1 at the device side;

(3) the handshaking phase PHASE_M(2) such as a handshaking phase PMU2, wherein during the handshaking phase PMU2, the memory device 100 can perform at least one handshaking operation according to predetermined data UPR2 (e.g., the predetermined data TRG_UPR2 as defined in the MIPI UniPro specification) of the handshaking phase PMU2 at the device side;

(4) the handshaking phase PHASE_M(3) such as a handshaking phase PMC, wherein during the handshaking phase PMC, the memory device 100 can perform at least one handshaking operation according to predetermined data CAP (e.g., one or a combination of the predetermined data PACP_CAP_EXT2_ind, the predetermined data PACP_CAP_EXT1_ind and the predetermined data PACP_CAP_ind as defined in the MIPI UniPro specification, such as the predetermined data {PACP_CAP_EXT2_ind, PACP_CAP_EXT1_ind, PACP_CAP_ind}) of the handshaking phase PMC at the device side, for example, the predetermined data CAP generated at the device side may represent capability data for indicating at least one capability parameter of the memory device 100 (e.g., the M-PHY circuit 118M), and the M-PHY circuit 118M may send the predetermined data CAP generated at the device side to the host device 50, for notifying the host device 50 of the aforementioned at least one capability parameter of the memory device 100; and (5) the handshaking phase PHASE_M(4) such as a handshaking phase PMA, wherein during the handshaking phase PMA, the memory device 100 can perform at least one handshaking operation according to predetermined data AFC (e.g., the predetermined data AFC carrying at least one parameter such as the parameter Creq as defined in the MIPI UniPro specification) of the handshaking phase PMA at the device side, for example, the predetermined data AFC generated at the device side may represent flow credit data for indicating at least one flow credit of the memory device 100, and the M-PHY circuit 118M may send the predetermined data AFC generated at the device side to the host device 50, for notifying the host device 50 of the aforementioned at least one flow credit of the memory device 100, such as a data buffer size of the memory device 100; where the handshaking phases PHASE_M (0), PHASE_M(1), PHASE_M(2), PHASE_M(3) and PHASE_M(4) may represent the handshaking phases PMU0, PMU1, PMU2, PMC and PMA at the device side (e.g., the memory device 100), respectively, but the present invention is not limited thereto. For example, one or more handshaking phases among the handshaking phases PMU0, PMU1, PMU2, PMC and PMA at the device side may comprise multiple sub-phases, and therefore, the handshaking phases PMU0, PMU1, PMU2, PMC and PMA at the device side and/or the sub-phases thereof may be renumbered among the handshaking phases {PHASE_M(i)|i=0, 1, 2, . . . }. In addition, the handshaking phases {PHASE_H(i)|i=0, 1, 2, . . . } of the handshaking procedure at the host side (e.g., the host device 50) may comprise at least five handshaking phases {PHASE_H(i)|i=0, 1, 2, 3, 4}, for example:

(1) the handshaking phase PHASE_H(0) such as a handshaking phase PHU0, wherein during the handshaking phase PHU0, the host device 50 can perform at least one handshaking operation according to predetermined data UPR0 (e.g., the predetermined data TRG_UPR0 as defined in the MIPI UniPro specification) of the handshaking phase PHU0 at the host side;

(2) the handshaking phase PHASE_H(1) such as a handshaking phase PHU1, wherein during the handshaking phase PHU1, the host device 50 can perform at least one handshaking operation according to predetermined data UPR1 (e.g., the predetermined data TRG_UPR1 as defined in the MIPI UniPro specification) of the handshaking phase PHU1 at the host side;

(3) the handshaking phase PHASE_H(2) such as a handshaking phase PHU2, wherein during the handshaking phase PHU2, the host device 50 can perform at least one handshaking operation according to predetermined data UPR2 (e.g., the predetermined data TRG_UPR2 as defined in the MIPI UniPro specification) of the handshaking phase PHU2 at the host side;

(4) the handshaking phase PHASE_H(3) such as a handshaking phase PHC, wherein during the handshaking phase PHC, the host device 50 can perform at least one handshaking operation according to predetermined data CAP (e.g., one or a combination of the predetermined data PACP_CAP_EXT2_ind, the predetermined data PACP_CAP_EXT1_ind and the predetermined data PACP_CAP_ind as defined in the MIPI UniPro specification, such as the predetermined data {PACP_CAP_EXT2_ind, PACP_CAP_EXT1_ind, PACP_CAP_ind}) of the handshaking phase PHC at the host side, for example, the predetermined data CAP generated at the host side may represent capability data for indicating at least one capability parameter of the host device 50, and the corresponding M-PHY circuit within the transmission interface circuit 58 of the host device 50 may send the predetermined data CAP generated at the host side to the memory device 100, for notifying the memory device 100 of the aforementioned at least one capability parameter of the host device 50; and (5) the handshaking phase PHASE_H(4) such as a handshaking phase PHA, wherein during the handshaking phase PHA, the host device 50 can perform at least one handshaking operation according to predetermined data AFC (e.g., the predetermined data AFC carrying at least one parameter such as the parameter Creq as defined in the MIPI UniPro specification) of the handshaking phase PHA at the host side, for example, the predetermined data AFC generated at the host side may represent flow credit data for indicating at least one flow credit of the host device and the corresponding M-PHY circuit within the transmission interface circuit 58 of the host device 50 may send the predetermined data AFC generated at the host side to the memory device 100, for notifying the memory device 100 of the aforementioned at least one flow credit of the host device 50, such as a data buffer size of the host device 50;

where the handshaking phases PHASE_H(0), PHASE_H (1), PHASE_H(2), PHASE_H(3) and PHASE_H(4) may represent the handshaking phases PHU0, PHU1, PHU2, PHC and PHA at the host side (e.g., the host device 50), respectively, but the present invention is not limited thereto. For example, one or more handshaking phases among the handshaking phases PHU0, PHU1, PHU2, PHC and PHA at the host side may comprise multiple sub-phases, and therefore, the handshaking phases PHU0, PHU1, PHU2, PHC and PHA at the host side and/or the sub-phases thereof may be renumbered among the handshaking phases {PHASE_H(i)|i=0, 1, 2, . . . }. For brevity, similar descriptions for these embodiments are not repeated in detail here.

Figure 3:
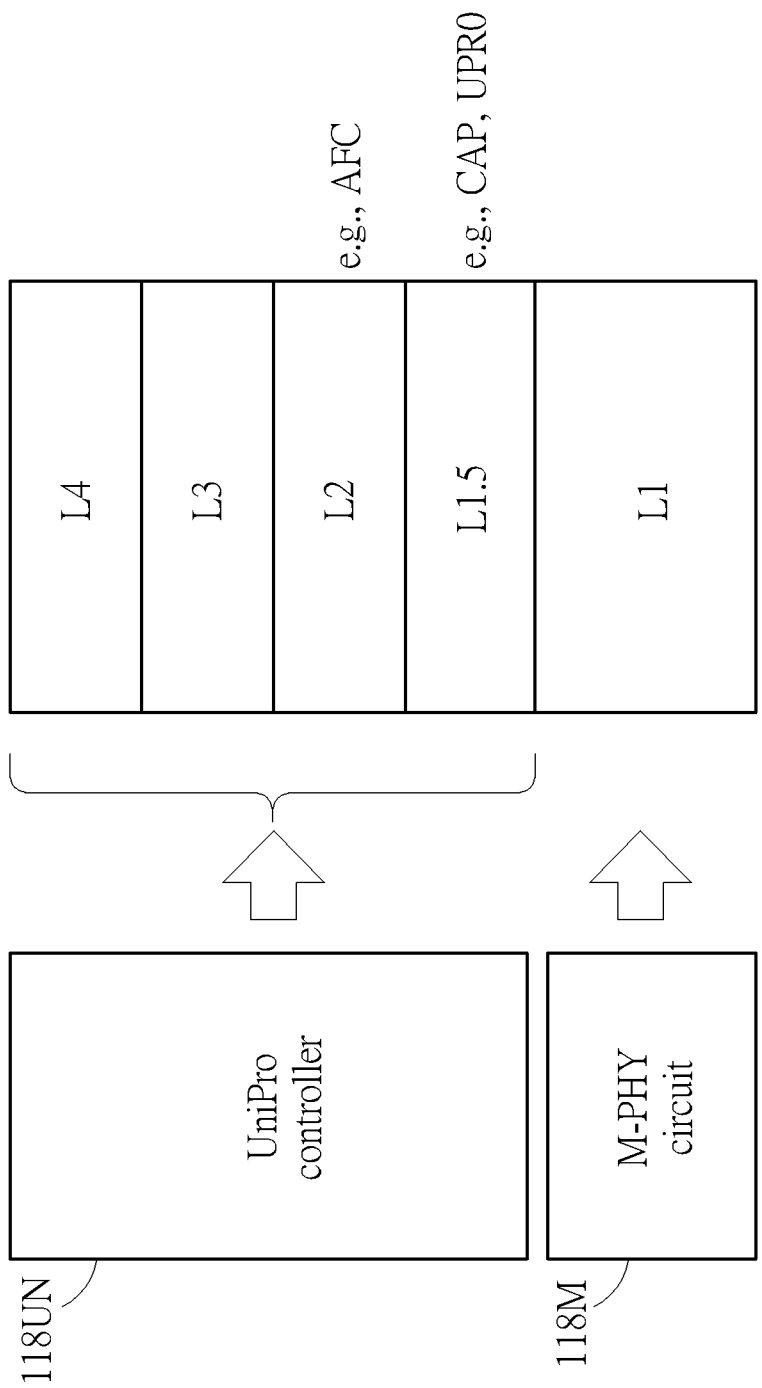
FIG. 3 illustrates some implementation details of the multi-layer control scheme shown in FIG. 2 according to an embodiment of the present invention.

FIG. 3 illustrates some implementation details of the multi-layer control scheme shown in FIG. 2 according to an embodiment of the present invention. For example, the multiple layers of the transmission interface circuit 118 may comprise the layers L1, L1.5, L2, L3, L4, etc., where the M-PHY circuit 118M may correspond to the layer L1, and the UniPro controller 118UN may correspond to the layers L1.5, L2, L3 and L4. In addition, during the handshaking procedure of the memory device 100, the upper layer controller 118U can perform one or more handshaking operations regarding a certain layer among the layers L1, L1.5, L2, L3, L4, etc. according to the predetermined data of a certain handshaking phase, and perform one or more other handshaking operations regarding another layer among the layers L1, L1.5, L2, L3, L4, etc. according to the predetermined data of another handshaking phase. For example, the UniPro controller 118UN can perform some handshaking operations regarding the layer L1.5 according to the respective predetermined data CAP, UPR0, etc. of the handshaking phases PMC, PMU0, etc., and perform one or more handshaking operations regarding the layer L2 according to the predetermined data AFC of the handshaking phase PMA. For brevity, similar descriptions for this embodiment are not repeated in detail here.

Figure 4:
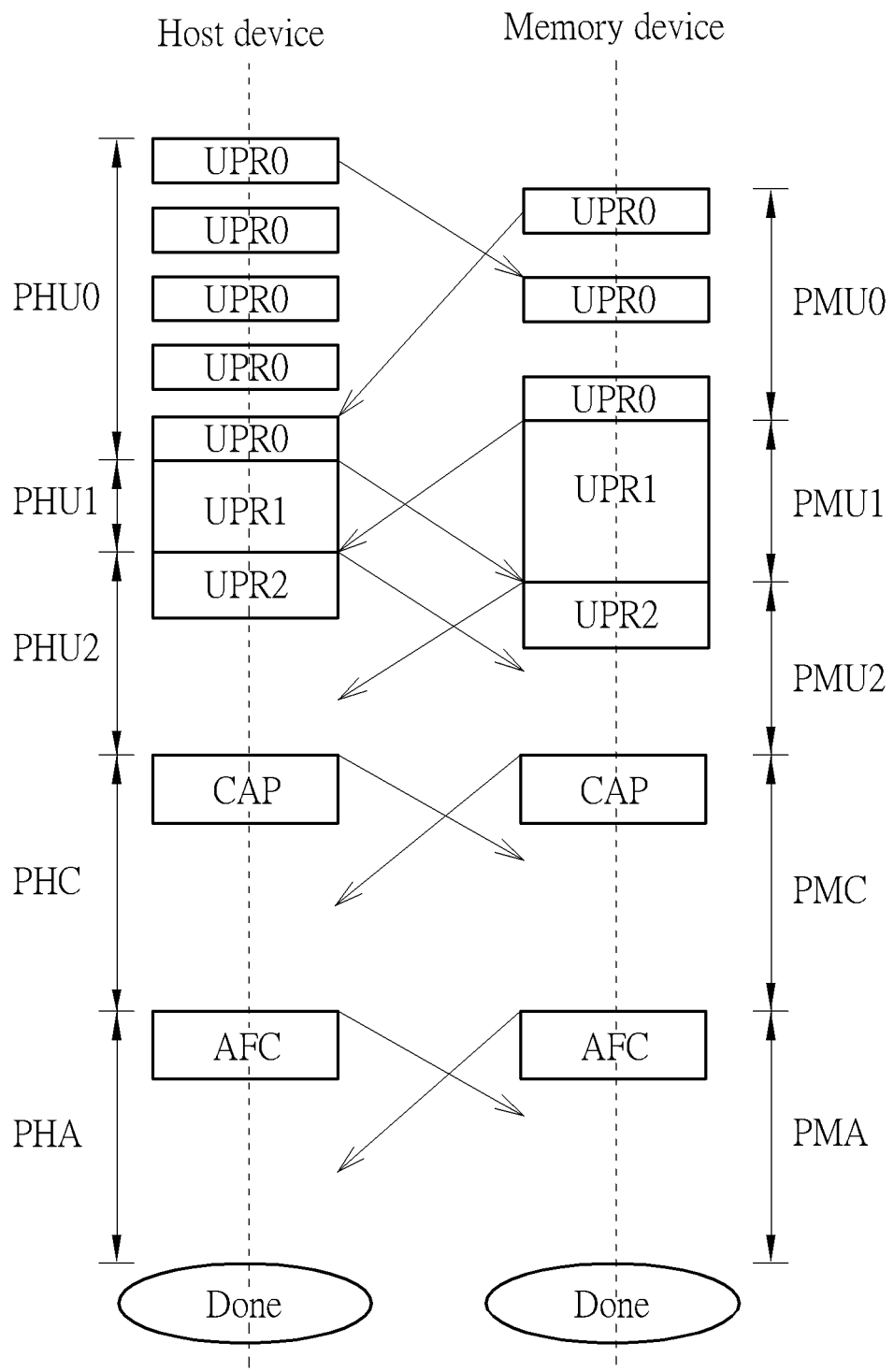
FIG. 4 illustrates a first link establishment control scheme according to an embodiment of the present invention.

FIG. 4 illustrates a first link establishment control scheme according to an embodiment of the present invention. For better comprehension, assume that the handshaking phase transition control mechanism of the memory device 100 (e.g., the memory controller 110) can be temporarily disabled, but the present invention is not limited thereto. As shown in FIG. 4, some transactions between the host device 50 and the memory device 100 may trigger some other transactions between the host device 50 and the memory device 100, where the arrows between the predetermined data {UPR0, UPR1, UPR2, CAP, AFC} generated at the host side (e.g., the host device 50) and the predetermined data {UPR0, UPR1, UPR2, CAP, AFC} generated at the device side (e.g., the memory device 100) may indicate the trigger events, respectively. For example, the associated operations of the device side may comprise:

(1) after receiving the predetermined data UPR0 generated at the host side, the memory device 100 may return the predetermined data UPR0 generated at the device side to the host device 50 one or more times, and then switch from the handshaking phase PMU0 to the handshaking phase PMU1, and more particularly, send the predetermined data UPR1 generated at the device side to the host device 50 one or more times;

(2) after receiving the predetermined data UPR1 generated at the host side, the memory device 100 may return the predetermined data UPR1 generated at the device side to the host device 50 one or more times, and then switch from the handshaking phase PMU1 to the handshaking phase PMU2, and more particularly, send the predetermined data UPR2 generated at the device side to the host device 50 one or more times;

(3) after receiving the predetermined data UPR2 generated at the host side, the memory device 100 may return the predetermined data UPR2 generated at the device side to the host device 50 one or more times, and then switch from the handshaking phase PMU2 to the handshaking phase PMC, and more particularly, send the predetermined data CAP generated at the device side to the host device 50; and (4) after the host device 50 and the memory device 100 have exchanged the predetermined data CAP generated at the host side and the predetermined data CAP generated at the device side, the memory device 100 may switch from the handshaking phase PMC to the handshaking phase PMA, and more particularly, send the predetermined data AFC generated at the device side to the host device 50;

where the beginning time point of a handshaking phase transition between two consecutive handshaking phases among the handshaking phases PMU0, PMU1, PMU2, PMC and PMA at the device side may be earlier than the beginning time point of a corresponding handshaking phase transition between two corresponding consecutive handshaking phases among the handshaking phases PHU0, PHU1, PHU2, PHC and PHA at the host side, but the present invention is not limited thereto. For another example, the associated operations of the host side may comprise:

(1) after receiving the predetermined data UPR0 generated at the device side, the host device 50 may return the predetermined data UPR0 generated at the host side to the memory device 100 one or more times, and then switch from the handshaking phase PHU0 to the handshaking phase PHU1, and more particularly, send the predetermined data UPR1 generated at the host side to the memory device 100 one or more times;

(2) after receiving the predetermined data UPR1 generated at the device side, the host device 50 may return the predetermined data UPR1 generated at the host side to the memory device 100 one or more times, and then switch from the handshaking phase PHU1 to the handshaking phase PHU2, and more particularly, send the predetermined data UPR2 generated at the host side to the memory device 100 one or more times;

(3) after receiving the predetermined data UPR2 generated at the device side, the host device 50 may return the predetermined data UPR2 generated at the host side to the memory device 100 one or more times, and then switch from the handshaking phase PHU2 to the handshaking phase PHC, and more particularly, send the predetermined data CAP generated at the host side to the memory device 100; and (4) after the host device 50 and the memory device 100 have exchanged the predetermined data CAP generated at the host side and the predetermined data CAP generated at the device side, the host device 50 may switch from the handshaking phase PHC to the handshaking phase PHA, and more particularly, send the predetermined data AFC generated at the host side to the memory device 100;

but the present invention is not limited thereto.

In a situation where there is nothing wrong, the host device 50 and the memory device 100 may complete the establishment of the link between the host device 50 and the memory device 100 (labeled "Done" for better comprehension). In some situations, however, a portion of predetermined data among the predetermined data {UPR0, UPR1, UPR2, CAP, AFC} generated at the host side cannot be successfully transmitted to the memory device 100 and/or a portion of predetermined data among the predetermined data {UPR0, UPR1, UPR2, CAP, AFC} generated at the device side cannot be successfully transmitted to the host device 50 due to some issues (e.g., interference). For example, when the handshaking phase transition between the handshaking phases PMU0 and PMU1 at the device side is triggered by the reception event of the predetermined data UPR0 generated at the host side, the predetermined data UPR0 generated at the device side may have not been successfully transmitted to the host device 50, and therefore, the host device 50 may keep waiting for the predetermined data UPR0 generated at the device side, and more particularly, get stuck in the handshaking phase PHU0. As a result, the host device 50 and the memory device 100 cannot complete the establishment of the link between the host device 50 and the memory device 100. Based on the present invention method, the memory device 100 (e.g., the memory controller 110) can prevent the host device 50 from getting stuck in any of the handshaking phases PHU0, PHU1, PHU2, PHC and PHA, and therefore can complete the establishment of the link between the host device 50 and the memory device 100.

Figure 5:
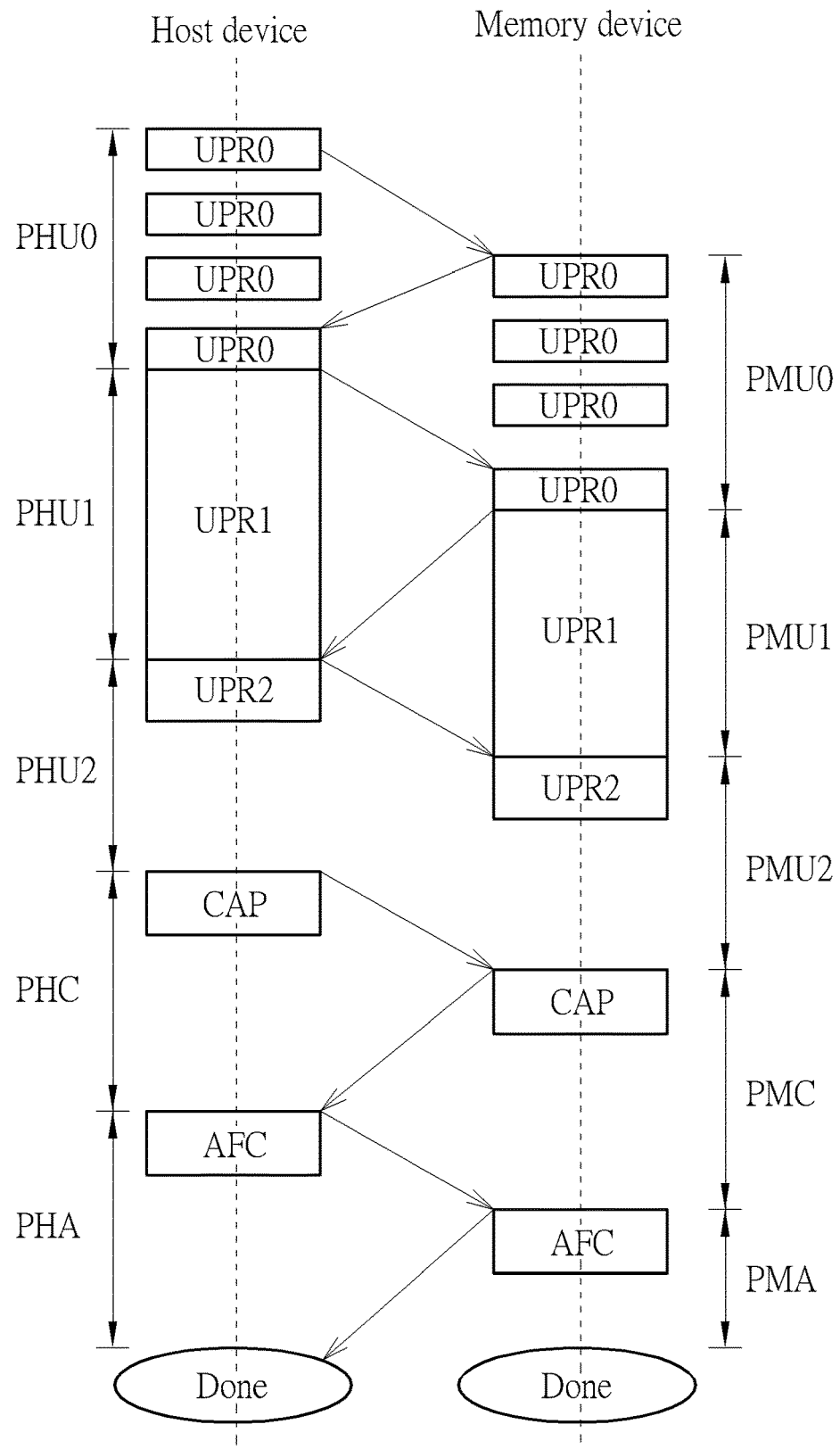
FIG. 5 illustrates a phase-transition-aware link establishment control scheme of the method for performing link management of the memory device in the predetermined communications architecture with aid of handshaking phase transition control according to an embodiment of the present invention.

FIG. 5 illustrates a phase-transition-aware link establishment control scheme of the method for performing link management of the memory device in the predetermined communications architecture with aid of handshaking phase transition control according to an embodiment of the present invention. The memory device 100 (e.g., the memory controller 110) can monitor the handshaking phase PHASE_H(i) (e.g., the handshaking phases PHU0, PHU1, PHU2, PHC and PHA at the host side) and control the handshaking phase PHASE_M(i) (e.g., the handshaking phases PMU0, PMU1, PMU2, PMC and PMA at the device side) according to the handshaking phase PHASE_H(i) of the host device 50, in order to make a handshaking phase transition between two consecutive handshaking phases among the handshaking phases PMU0, PMU1, PMU2, PMC and PMA at the device side come after a corresponding handshaking phase transition between two corresponding consecutive handshaking phases among the handshaking phases PHU0, PHU1, PHU2, PHC and PHA at the host side. As a result, the beginning time point of the handshaking phase transition between the two consecutive handshaking phases among the handshaking phases PMU0, PMU1, PMU2, PMC and PMA at the device side may be almost equal to (e.g., slightly later than) the beginning time point of the corresponding handshaking phase transition between the two corresponding consecutive handshaking phases among the handshaking phases PHU0, PHU1, PHU2, PHC and PHA at the host side. For example, the associated operations at the device side may comprise:

(1) the memory controller 110 can utilize the aforementioned at least one upper layer controller such as the upper layer controller 118U to turn on the M-PHY circuit 118M, for starting establishing the link between the host device 50 and the memory device 100;

(2) before entering a first handshaking phase (e.g., the handshaking phase PMU1) of the handshaking procedure (e.g., the handshaking procedure for establishing the link between the host device 50 and the memory device 100) of the memory device 100, the memory controller 110 can utilize the M-PHY circuit 118M to receive any first incoming data sent from the host device 50 to determine whether the aforementioned any first incoming data indicates that the host device 50 is in a corresponding first handshaking phase (e.g., the handshaking phase PHU1), and prevent sending any outgoing data that is equal to first predetermined data (e.g., the predetermined data UPR1 generated at the device side) of the first handshaking phase to the host device 50 before detecting that the host device 50 is in the corresponding first handshaking phase, where the first handshaking phase (e.g., the handshaking phase PMU1) is not earliest among multiple handshaking phases (e.g., the handshaking phases PMU0, PMU1, PMU2, PMC and PMA) of the handshaking procedure at the device side; and (3) in response to the aforementioned any first incoming data indicating that the host device 50 is in the corresponding first handshaking phase (e.g., the handshaking phase PHU1), the memory controller 110 can enter the first handshaking phase (e.g., the handshaking phase PMU1) and utilize the M-PHY circuit 118M to send first outgoing data that is equal to the first predetermined data (e.g., the predetermined data UPR1 generated at the device side) to the host device 50; where the memory controller 110 can determine whether the aforementioned any first incoming data indicates that the host device 50 is in the corresponding first handshaking phase (e.g., the handshaking phase PHU1) according to whether the aforementioned any first incoming data is equal to corresponding first predetermined data (e.g., the predetermined data UPR1 generated at the host side) of the corresponding first handshaking phase (e.g., the handshaking phase PHU1), such as the corresponding first predetermined data generated in the corresponding first handshaking phase at the host side, but the present invention is not limited thereto.

In addition to the first handshaking phase (e.g., the handshaking phase PMU1), the multiple handshaking phases (e.g., the handshaking phases PMU0, PMU1, PMU2, PMC and PMA) of the handshaking procedure may further comprise a preceding handshaking phase (e.g., the handshaking phase PMU0) prior to the first handshaking phase. During the preceding handshaking phase, the memory controller 110 can utilize the M-PHY circuit 118M to communicate with the host device 50 to exchange preceding outgoing data and preceding incoming data, where the preceding outgoing data is equal to preceding predetermined data (e.g., the predetermined data UPR0 generated at the device side) of the preceding handshaking phase (e.g., the handshaking phase PMU0), and the preceding incoming data is equal to corresponding preceding predetermined data (e.g., the predetermined data UPR0 generated at the host side) of a corresponding preceding handshaking phase (e.g., the handshaking phase PHU0) at the host device 50. For example, the associated operations at the device side may comprise:

(1) before entering the preceding handshaking phase of the handshaking procedure of the memory device 100, such as the preceding handshaking phase (e.g., the handshaking phase PMU0) prior to the first handshaking phase (e.g., the handshaking phase PMU1), the memory controller 110 can utilize the M-PHY circuit 118M to receive any preceding incoming data sent from the host device 50 to determine whether the aforementioned any preceding incoming data indicates that the host device 50 is in a corresponding preceding handshaking phase (e.g., the handshaking phase PHU0), and prevent sending any outgoing data that is equal to preceding predetermined data (e.g., the predetermined data UPR0 generated at the device side) of the preceding handshaking phase to the host device 50 before detecting that the host device 50 is in the corresponding preceding handshaking phase; and (2) in response to the aforementioned any preceding incoming data indicating that the host device 50 is in the corresponding preceding handshaking phase (e.g., the handshaking phase PHU0), the memory controller 110 can enter the preceding handshaking phase (e.g., the handshaking phase PMU0) and utilize the M-PHY circuit 118 to send preceding outgoing data that is equal to the preceding predetermined data (e.g., the predetermined data UPR0 generated at the device side) to the host device 50;

where the memory controller 110 can determine whether the aforementioned any preceding incoming data indicates that the host device 50 is in the corresponding preceding handshaking phase (e.g., the handshaking phase PHU0) according to whether the aforementioned any preceding incoming data is equal to corresponding preceding predetermined data (e.g., the predetermined data UPR0 generated at the host side) of the corresponding preceding handshaking phase (e.g., the handshaking phase PHU0), such as the corresponding preceding predetermined data generated in the corresponding preceding handshaking phase at the host side, but the present invention is not limited thereto. According to some embodiments, during the preceding handshaking phase of the handshaking procedure of the memory device 100, such as the preceding handshaking phase (e.g., the handshaking phase PMU0) prior to the first handshaking phase (e.g., the handshaking phase PMU1), the memory controller 110 can utilize the M-PHY circuit 118M to send the preceding outgoing data that is equal to the preceding predetermined data (e.g., the predetermined data UPR0 generated at the device side) of the preceding handshaking phase to the host device 50, no matter whether any preceding incoming data indicating that the host device 50 is in the corresponding preceding handshaking phase (e.g., the handshaking phase PHU0) is received from the host device in advance.

In addition to the preceding handshaking phase (e.g., the handshaking phase PMU0) and the first handshaking phase (e.g., the handshaking phase PMU1), the multiple handshaking phases (e.g., the handshaking phases PMU0, PMU1, PMU2, PMC and PMA) of the handshaking procedure of the memory device 100 may comprise more handshaking phases. For example, the associated operations at the device side may comprise:

(1) before entering a second handshaking phase of the handshaking procedure of the memory device 100, such as the second handshaking phase (e.g., the handshaking phase PMU2) posterior to the first handshaking phase (e.g., the handshaking phase PMU1), the memory controller 110 can utilize the M-PHY circuit 118M to receive any second incoming data sent from the host device to determine whether the aforementioned any second incoming data indicates that the host device 50 is in a corresponding second handshaking phase (e.g., the handshaking phase PHU2), and prevent sending any outgoing data that is equal to second predetermined data (e.g., the predetermined data UPR2 generated at the device side) of the second handshaking phase to the host device 50 before detecting that the host device 50 is in the corresponding second handshaking phase; and (2) in response to the aforementioned any second incoming data indicating that the host device 50 is in the corresponding second handshaking phase (e.g., the handshaking phase PHU2), the memory controller 110 can enter the second handshaking phase (e.g., the handshaking phase PMU2) and utilize the M-PHY circuit 118M to send second outgoing data that is equal to the second predetermined data (e.g., the predetermined data UPR2 generated at the device side) to the host device 50;

where the memory controller 110 can determine whether the aforementioned any second incoming data indicates that the host device 50 is in the corresponding second handshaking phase (e.g., the handshaking phase PHU2) according to whether the aforementioned any second incoming data is equal to corresponding second predetermined data (e.g., the predetermined data UPR2 generated at the host side) of the corresponding second handshaking phase (e.g., the handshaking phase PHU2), such as the corresponding second predetermined data generated in the corresponding second handshaking phase at the host side, but the present invention is not limited thereto.

As shown in FIG. 5, the multiple handshaking phases of the handshaking procedure of the memory device 100 may further comprise multiple subsequent handshaking phases such as the handshaking phases PMC and PMA. For example, the associated operations at the device side may further comprise:

(1) before entering a subsequent handshaking phase of the handshaking procedure of the memory device 100, such as the subsequent handshaking phase (e.g., the handshaking phase PMC) posterior to the second handshaking phase (e.g., the handshaking phase PMU2), the memory controller 110 can utilize the M-PHY circuit 118M to receive any subsequent incoming data sent from the host device 50 to determine whether the aforementioned any subsequent incoming data indicates that the host device 50 is in a corresponding subsequent handshaking phase (e.g., the handshaking phase PHC), and prevent sending any outgoing data that is equal to subsequent predetermined data (e.g., the predetermined data CAP generated at the device side) of the subsequent handshaking phase to the host device 50 before detecting that the host device 50 is in the corresponding subsequent handshaking phase;

(2) in response to the aforementioned any subsequent incoming data indicating that the host device is in the corresponding subsequent handshaking phase (e.g., the handshaking phase PHC), the memory controller 110 can enter the subsequent handshaking phase (e.g., the handshaking phase PMC) and utilize the M-PHY circuit 118M to send subsequent outgoing data that is equal to the subsequent predetermined data (e.g., the predetermined data CAP generated at the device side) to the host device 50;

(3) before entering another subsequent handshaking phase of the handshaking procedure of the memory device 100, such as the other subsequent handshaking phase (e.g., the handshaking phase PMA) posterior to both of the second handshaking phase (e.g., the handshaking phase PMU2) and the subsequent handshaking phase (e.g., the handshaking phase PMC), the memory controller 110 can utilize the M-PHY circuit 118M to receive any other subsequent incoming data sent from the host device 50 to determine whether the aforementioned any other subsequent incoming data indicates that the host device 50 is in another corresponding subsequent handshaking phase (e.g., the handshaking phase PHA), and prevent sending any outgoing data that is equal to other subsequent predetermined data (e.g., the predetermined data AFC generated at the device side) of the other subsequent handshaking phase to the host device 50 before detecting that the host device is in the other corresponding subsequent handshaking phase; and (4) in response to the aforementioned any other subsequent incoming data indicating that the host device 50 is in the other corresponding subsequent handshaking phase (e.g., the handshaking phase PHA), the memory controller 110 can enter the other subsequent handshaking phase (e.g., the handshaking phase PMA) and utilize the M-PHY circuit 118M to send subsequent outgoing data that is equal to the other subsequent predetermined data (e.g., the predetermined data AFC generated at the device side) to the host device 50;

where the memory controller 110 can determine whether the aforementioned any subsequent incoming data indicates that the host device 50 is in the corresponding subsequent handshaking phase (e.g., the handshaking phase PHC) according to whether the aforementioned any subsequent incoming data is equal to corresponding subsequent predetermined data (e.g., the predetermined data CAP generated at the host side) of the corresponding subsequent handshaking phase (e.g., the handshaking phase PHC), such as the corresponding subsequent predetermined data generated in the corresponding subsequent handshaking phase at the host side, and can determine whether the aforementioned any other subsequent incoming data indicates that the host device 50 is in the other corresponding subsequent handshaking phase (e.g., the handshaking phase PHA) according to whether the aforementioned any other subsequent incoming data is equal to other corresponding subsequent predetermined data (e.g., the predetermined data AFC generated at the host side) of the other corresponding subsequent handshaking phase (e.g., the handshaking phase PHA), such as the other corresponding subsequent predetermined data generated in the other corresponding subsequent handshaking phase at the host side, but the present invention is not limited thereto. For brevity, similar descriptions for this embodiment are not repeated in detail here.

Figure 6:
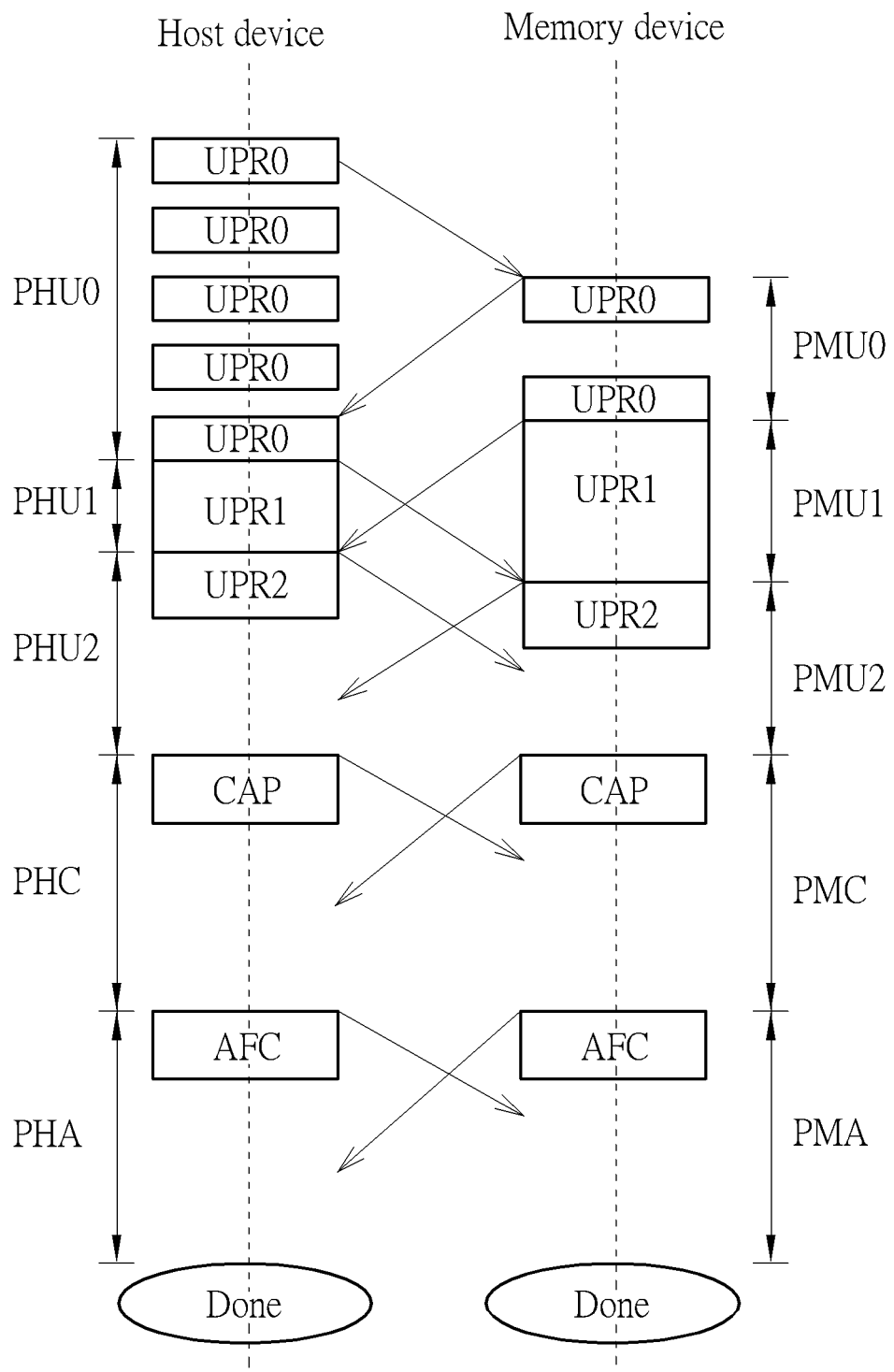
FIG. 6 illustrates a second link establishment control scheme according to an embodiment of the present invention.

FIG. 6 illustrates a second link establishment control scheme according to an embodiment of the present invention. For better comprehension, assume that the handshaking phase transition control mechanism of the memory device 100 (e.g., the memory controller 110) can be temporarily disabled, but the present invention is not limited thereto. As shown in FIG. 6, some transactions between the host device 50 and the memory device 100 may trigger some other transactions between the host device 50 and the memory device 100, where the arrows between the predetermined data {UPR0, UPR1, UPR2, CAP, AFC} generated at the host side (e.g., the host device 50) and the predetermined data {UPR0, UPR1, UPR2, CAP, AFC} generated at the device side (e.g., the memory device 100) may indicate the trigger events, respectively. In comparison with the embodiment shown in FIG. 4, the memory device 100 of the embodiment shown in FIG. 6 may wait for the first predetermined data UPR0 generated at the host side until it is received, and then start transmitting the first predetermined data UPR0 generated at the device side. In a situation where there is nothing wrong, the host device 50 and the memory device 100 may complete the establishment of the link between the host device 50 and the memory device 100 (labeled "Done" for better comprehension). In some situations, however, a portion of predetermined data among the predetermined data {UPR0, UPR1, UPR2, CAP, AFC} generated at the host side cannot be successfully transmitted to the memory device 100 and/or a portion of predetermined data among the predetermined data {UPR0, UPR1, UPR2, CAP, AFC} generated at the device side cannot be successfully transmitted to the host device 50 due to some issues (e.g., interference). As a result, the host device 50 and the memory device 100 cannot complete the establishment of the link between the host device 50 and the memory device 100. Based on the present invention method, the memory device 100 (e.g., the memory controller 110) can prevent the host device 50 from getting stuck in any of the handshaking phases PHU0, PHU1, PHU2, PHC and PHA, and therefore can complete the establishment of the link between the host device 50 and the memory device 100.

Figure 7:
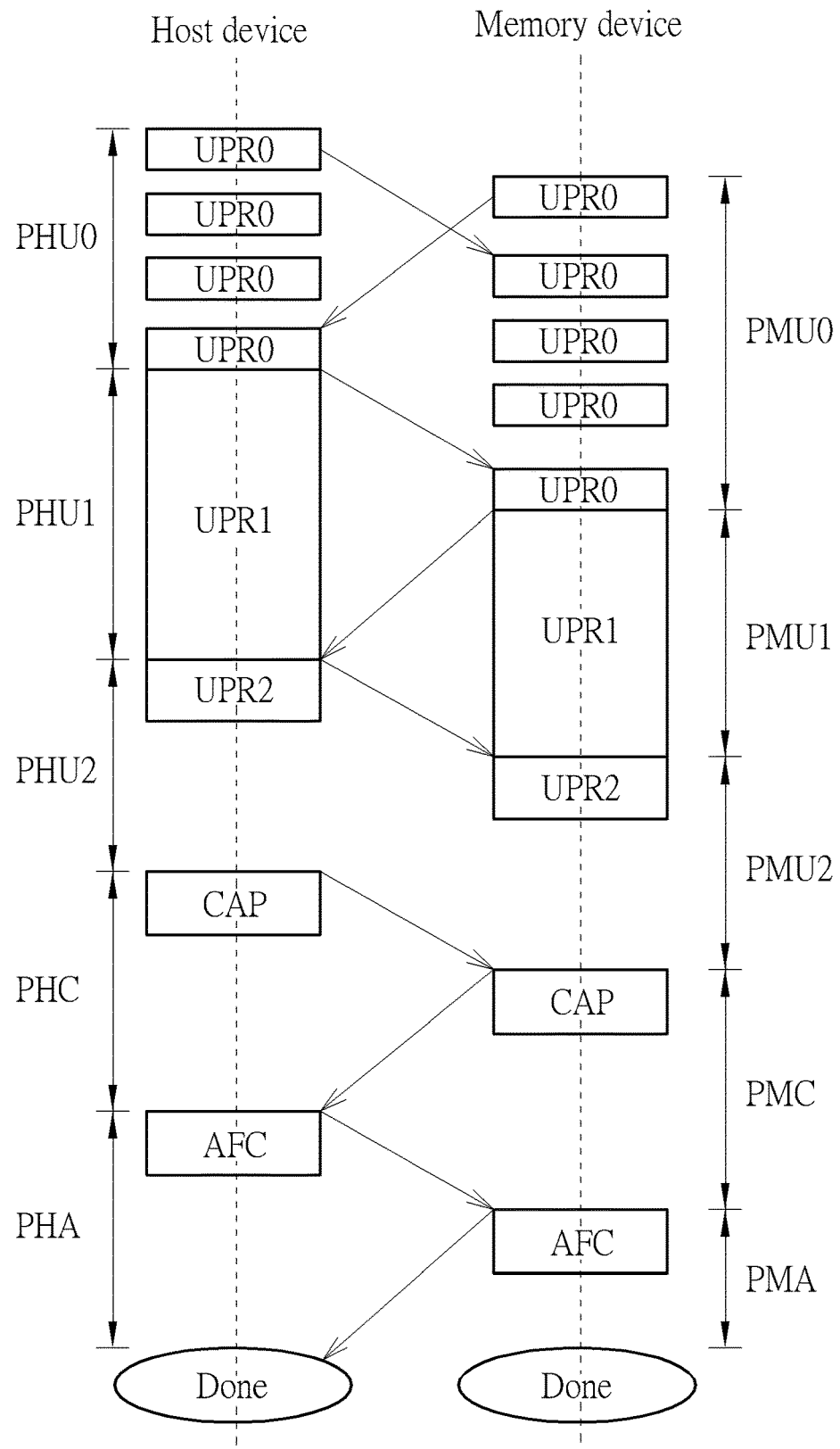
FIG. 7 illustrates a phase-transition-aware link establishment control scheme of the method for performing link management of the memory device in the predetermined communications architecture with aid of handshaking phase transition control according to another embodiment of the present invention.

FIG. 7 illustrates a phase-transition-aware link establishment control scheme of the method for performing link management of the memory device in the predetermined communications architecture with aid of handshaking phase transition control according to another embodiment of the present invention. In comparison with the embodiment shown in FIG. 5, the memory device 100 of the embodiment shown in FIG. 7 can start entering the preceding handshaking phase (e.g., the handshaking phase PMU0) in the beginning of the handshaking procedure of the memory device 100, having no need to wait for the reception event of the corresponding preceding predetermined data (e.g., the predetermined data UPR0 generated at the host side) of the corresponding preceding handshaking phase (e.g., the handshaking phase PHU0). During the preceding handshaking phase (e.g., the handshaking phase PMU0), the memory controller 110 can utilize the M-PHY circuit 118M to send the preceding outgoing data that is equal to the preceding predetermined data (e.g., the predetermined data UPR0 generated at the device side) of the preceding handshaking phase to the host device 50, no matter whether any preceding incoming data indicating that the host device 50 is in the corresponding preceding handshaking phase (e.g., the handshaking phase PHU0) is received from the host device 50 in advance. For brevity, similar descriptions for this embodiment are not repeated in detail here.

Figure 8:
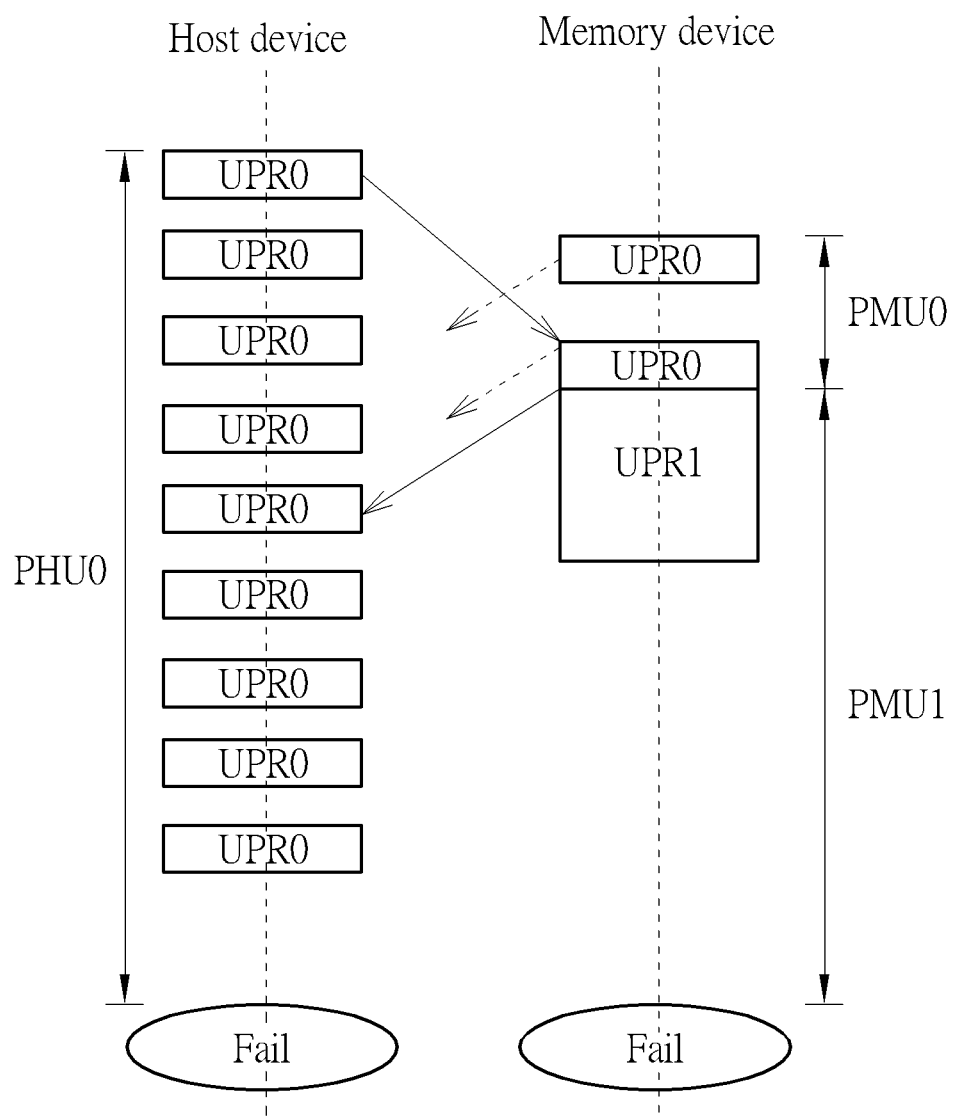
FIG. 8 illustrates an example of a handshaking operation getting stuck in a situation where some signals are not successfully transmitted.

FIG. 8 illustrates an example of a handshaking operation getting stuck in a situation where some signals are not successfully transmitted. For better comprehension, assume that the handshaking phase transition control mechanism of the memory device 100 (e.g., the memory controller 110) can be temporarily disabled, but the present invention is not limited thereto. Among the arrows between the predetermined data {UPR0} generated at the host side (e.g., the host device 50) and the predetermined data {UPR0, UPR1} generated at the device side (e.g., the memory device 100) as shown in FIG. 8, the first arrow on the top may represent a first signal that is successfully transmitted from the host device 50 to the memory device 100, the two arrows depicted with dashed lines may represent a set of second signals that are not successfully transmitted from the memory device 100 to the host device 50, and the remaining arrow may represent a third signal that is successfully transmitted from the memory device 100 to the host device 50 but is not helpful on the establishment of the link between the host device 50 and the memory device 100, where the first signal may carry the first one of the predetermined data {UPR0} generated at the host side, the set of second signals may carry the predetermined data {UPR0} generated at the device side, and the third signal may carry the first one of the predetermined data {UPR1} generated at the device side. For example, when the handshaking phase transition between the handshaking phases PMU0 and PMU1 at the device side is triggered by the reception event of the predetermined data UPR0 generated at the host side, the predetermined data UPR0 generated at the device side may have not been successfully transmitted to the host device 50, and therefore, the host device 50 may keep waiting for the predetermined data UPR0 generated at the device side, and more particularly, get stuck in the handshaking phase PHU0. As a result, the host device 50 and the memory device 100 cannot complete the establishment of the link between the host device 50 and the memory device 100 (labeled "Fail" for better comprehension). Based on the present invention method, the memory device 100 (e.g., the memory controller 110) can prevent the problem shown in FIG. 8.

Figure 9:
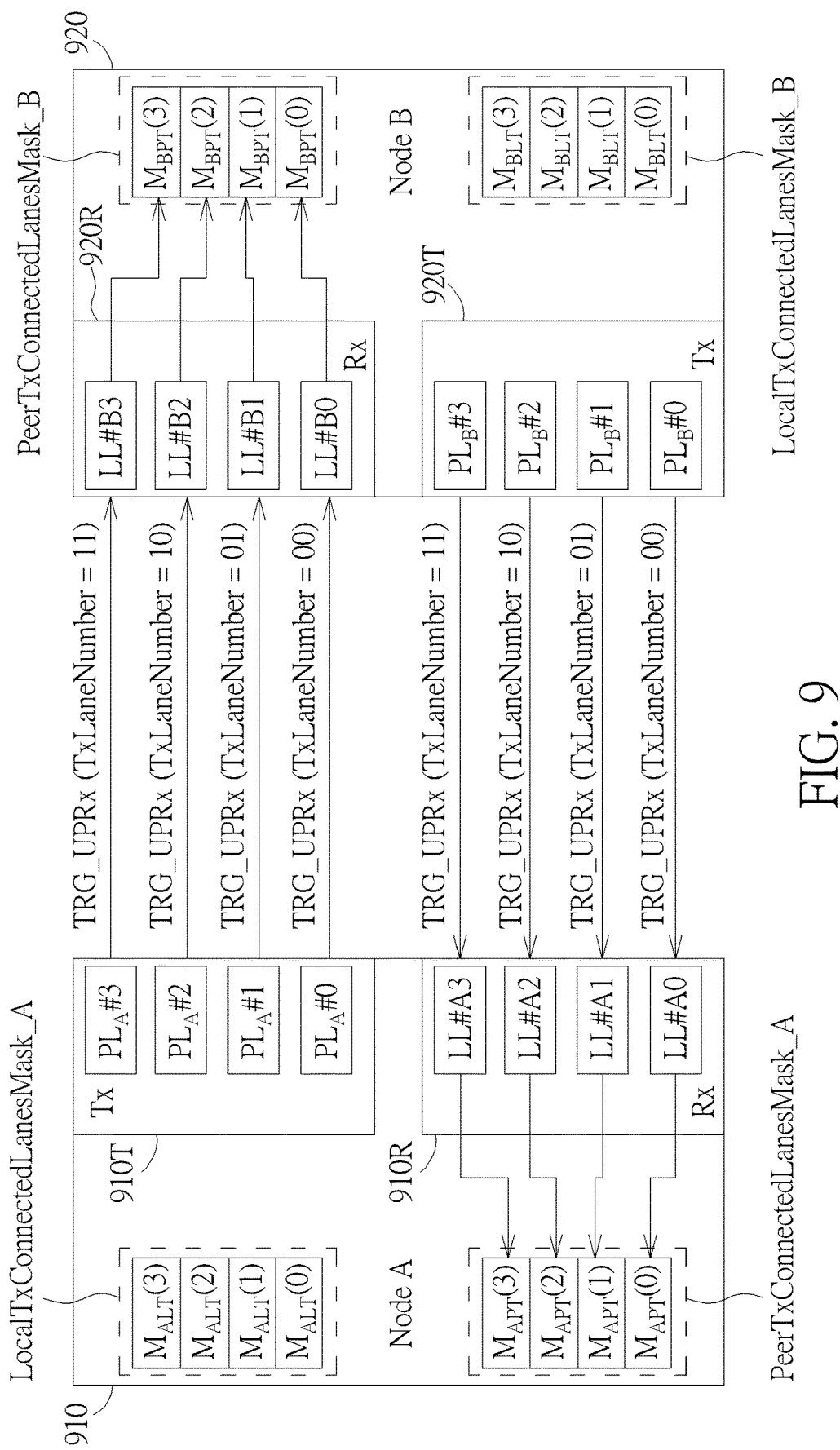
FIG. 9 illustrates a handshaking control scheme of the method for performing link management of the memory device in the predetermined communications architecture with aid of handshaking phase transition control according to another embodiment of the present invention.

FIG. 9 illustrates a handshaking control scheme of the method for performing link management of the memory device in the predetermined communications architecture with aid of handshaking phase transition control according to another embodiment of the present invention. In the architecture shown in FIG. 9, the device 910 acting as the node A (labeled "Node A" for brevity) can be taken as an example of the host device 50, and the device 920 acting as the node B (labeled "Node B" for brevity) can be taken as an example of the memory device 100, where the transmitter (Tx) 920T and the receiver (Rx) 920R in the node B may represent the transmitter 118MT and the receiver 118MR within the transmission interface circuit 118 at the device side (e.g., the memory device 100), respectively, and the transmitter (Tx) 910T and the receiver (Rx) 910R in the node A may represent the corresponding transmitter and the corresponding receiver within the transmission interface circuit 58 at the host side (e.g., the host device 50), respectively. In addition, each transmitter among the transmitters 910T and 920T may comprise multiple transmitter (Tx) data lanes such as four physical lanes #0, #1, #2 and #3, and each receiver among the receivers 910R and 920R may comprise multiple receiver (Rx) data lanes such as four physical lanes #0, #1, #2 and #3, where the physical lanes of the receiver 920R in the node B may be respectively coupled to the physical lanes (PL) #0, #1, #2 and #3 of the transmitter 910T in the node A (labeled "$PL_A$" for brevity), and may be respectively assigned as logical lanes (LL) #B0, #B1, #B2 and #B3 when their connections are detected (e.g., the predetermined data {UPR1} generated at the host side are received through the physical lanes of the receiver 920R in the node B), and the physical lanes of the receiver 910R in the node A may be respectively coupled to the physical lanes (PL) #0, #1, #2 and #3 of the transmitter 920T in the node B (labeled "$PL_B$" for brevity), and may be respectively assigned as logical lanes (LL) #A0, #A1, #A2 and #A3 when their connections are detected (e.g., the predetermined data {UPR1} generated at the device side are received through the physical lanes of the receiver 910R in the node A), but the present invention is not limited thereto. According to some embodiments, the architecture shown in FIG. 9, the number of connected physical lanes among the physical lanes of the receiver 910R in the node A, and/or the number of connected physical lanes among the physical lanes of the receiver 920R in the node B may vary.

For example, the node A can generate the predetermined data {UPR0, UPR1, UPR2} such as the predetermined data {TRG_UPR0, TRG_UPR1, TRG_UPR2} according the following formats:

$TRG\_UPR0=MK1+TRG0\_code+Tx\text{LaneNumber};$ (1)

$TRG\_UPR1=MK1+TRG1\_code+PeerTx\text{Connected-LanesMask}\_A;\text{ and}$ (2)

$TRG\_UPR2=MK1+TRG2\_code;$ (3)

where the MK1 in the beginning of each format among the above formats may represent a predetermined symbol, the codes TRG0_code, TRG1_code and TRG2_code may represent predetermined codes corresponding to the handshaking phases PHU0, PHU1 and PHU2 at the host side, respectively, the transmitter lane number TxLaneNumber may represent the lane number of a physical lane among the physical lanes #0, #1, #2 and #3 of the transmitter 910T in the node A, such as one of the binary values {00, 01, 10, 11}, and the peer transmitter connected lanes mask PeerTxConnectedLanesMask_A may represent a mask indicating the connected lanes in the transmitter 920T at the peer device (e.g., the device 920 acting as the node B). As shown in the upper half of FIG. 9, the transmitter 910T in the node A can send out the predetermined data {TRG_UPRx|x=0, 1, 2} (e.g., the predetermined data {TRG_UPR0, TRG_UPR1, TRG_UPR2}) through the physical lanes #0, #1, #2 and #3 thereof (labeled "$PL_A$" for brevity), respectively, for being received by the physical lanes of the receiver 920R in the node B.

For another example, the node B can generate the predetermined data {UPR0, UPR1, UPR2} such as the predetermined data {TRG_UPR0, TRG_UPR1, TRG_UPR2} according the following formats:

$TRG\_UPR0=MK1+TRG0\_code+Tx\text{LaneNumber};$ (1)

$TRG\_UPR1=MK1+TRG1\_code+PeerTx\text{Connected-LanesMask}\_B;\text{ and}$ (2)

$TRG\_UPR2=MK1+TRG2\_code;$ (3)

where the MK1 in the beginning of each format among the above formats may represent the predetermined symbol, the codes TRG0_code, TRG1_code and TRG2_code may represent predetermined codes corresponding to the handshaking phases PMU0, PMU1 and PMU2 at the device side, respectively, the transmitter lane number TxLaneNumber may represent the lane number of a physical lane among the physical lanes #0, #1, #2 and #3 of the transmitter 920T in the node B, such as one of the binary values {00, 01, 10, 11}, and the peer transmitter connected lanes mask PeerTxConnectedLanesMask_B may represent a mask indicating the connected lanes in the transmitter 910T at the peer device (e.g., the device 910 acting as the node A). As shown in the lower half of FIG. 9, the transmitter 920T in the node B can send out the predetermined data {TRG_UPRx|x=0, 1, 2} (e.g., the predetermined data {TRG_UPR0, TRG_UPR1, TRG_UPR2}) through the physical lanes #0, #1, #2 and #3 thereof (labeled "$PL_B$" for brevity), respectively, for being received by the physical lanes of the receiver 910R in the node A.

Regarding the upper half of the architecture shown in FIG. 9, when receiving the predetermined data {TRG_UPR0} through the four physical lanes of the receiver 920R, respectively, the node B can record the corresponding sub-masks {$M_{BPT}(0)$, $M_{BPT}(1)$, $M_{BPT}(2)$, $M_{BPT}(3)$} of the peer transmitter connected lanes mask PeerTxConnectedLanesMask_B to be {1, 1, 1, 1}, respectively, for indicating the connectivity states (e.g., the connected states) of the physical lanes #0, #1, #2 and #3 of the transmitter 910T, respectively, but the present invention is not limited thereto. According to some embodiments, when the predetermined data {TRG_UPR0} from one or more physical lanes (e.g., the physical lanes #0 and #1) of the transmitter 910T cannot be received by the receiver 920R, the node B can record the corresponding sub-masks {$M_{BPT}(0)$, $M_{BPT}(1)$, $M_{BPT}(2)$, $M_{BPT}(3)$} of the peer transmitter connected lanes mask PeerTxConnectedLanesMask_B (e.g., record the corresponding sub-masks {$M_{BPT}(0)$, $M_{BPT}(1)$, $M_{BPT}(2)$, $M_{BPT}(3)$} to be {0, 0, 1, 1} in a situation where the one or more physical lanes that are not connected are the physical lanes #0 and #1 of the transmitter 910T), for indicating the connectivity states (e.g., the connected or disconnected states) of the physical lanes #0, #1, #2 and #3 of the transmitter 910T, respectively. Regarding the lower half of the architecture shown in FIG. 9, when receiving the predetermined data {TRG_UPR0} through the four physical lanes of the receiver 910R, respectively, the node A can record the corresponding sub-masks {$M_{APT}(0)$, $M_{APT}(1)$, $M_{APT}(2)$, $M_{APT}(3)$} of the peer transmitter connected lanes mask PeerTxConnectedLanesMask_A to be {1, 1, 1, 1}, respectively, for indicating the connectivity states (e.g., the connected states) of the physical lanes #0, #1, #2 and #3 of the transmitter 920T, respectively, but the present invention is not limited thereto. According to some embodiments, when the predetermined data {TRG_UPR0} from one or more physical lanes (e.g., the physical lanes #0, #1 and #3) of the transmitter 920T cannot be received by the receiver 910R, the node A can record the corresponding sub-masks {$M_{APT}(0)$, $M_{APT}(1)$, $M_{APT}(2)$, $M_{APT}(3)$} of the peer transmitter connected lanes mask PeerTxConnectedLanesMask_A (e.g., record the corresponding sub-masks {$M_{APT}(0)$, $M_{APT}(1)$, $M_{APT}(2)$, $M_{APT}(3)$} to be {0, 0, 1, 0} in a situation where the one or more physical lanes that are not connected are the physical lanes #0, #1 and #3 of the transmitter 920T), for indicating the connectivity states (e.g., the connected or disconnected states) of the physical lanes #0, #1, #2 and #3 of the transmitter 920T, respectively.

As the predetermined data TRG_UPR1 generated by the node A carries the peer transmitter connected lanes mask PeerTxConnectedLanesMask_A, the node B can obtain the peer transmitter connected lanes mask PeerTxConnectedLanesMask_A from the predetermined data TRG_UPR1 sent from the node A, and update the local transmitter connected lanes mask LocalTxConnectedLanesMask_B with the peer transmitter connected lanes mask PeerTxConnectedLanesMask_A, to make the corresponding sub-masks $\{M_{BLT}(0), M_{BLT}(1), M_{BLT}(2), M_{BLT}(3)\}$ of the local transmitter connected lanes mask LocalTxConnectedLanesMask_B be equal to the sub-masks $\{M_{APT}(0), M_{APT}(1), M_{APT}(2), M_{APT}(3)\}$ (e.g., $\{1, 1, 1, 1\}$) of the peer transmitter connected lanes mask PeerTxConnectedLanesMask_A, respectively, for indicating the connectivity states (e.g., the connected states) of the physical lanes #0, #1, #2 and #3 of the transmitter 920T, respectively. In addition, as the predetermined data TRG_UPR1 generated by the node B carries the peer transmitter connected lanes mask PeerTxConnectedLanesMask_B, the node A can obtain the peer transmitter connected lanes mask PeerTxConnectedLanesMask_B from the predetermined data TRG_UPR1 sent from the node B, and update the local transmitter connected lanes mask LocalTxConnectedLanesMask_A with the peer transmitter connected lanes mask PeerTxConnectedLanesMask_B, to make the corresponding sub-masks $\{M_{ALT}(0), M_{ALT}(1), M_{ALT}(2), M_{ALT}(3)\}$ of the local transmitter connected lanes mask LocalTxConnectedLanesMask_A be equal to the sub-masks $\{M_{BPT}(0), M_{BPT}(1), M_{BPT}(2), M_{BPT}(3)\}$ (e.g., $\{1, 1, 1, 1\}$) of the peer transmitter connected lanes mask PeerTxConnectedLanesMask_B, respectively, for indicating the connectivity states (e.g., the connected states) of the physical lanes #0, #1, #2 and #3 of the transmitter 910T, respectively.

According to some embodiments, the predetermined codes corresponding to the handshaking phases PMU0, PMU1 and PMU2 at the device side can be equal to the predetermined codes corresponding to the handshaking phases PHU0, PHU1 and PHU2 at the host side, respectively, but the present invention is not limited thereto. For brevity, similar descriptions for these embodiments are not repeated in detail here.

Figure 10:
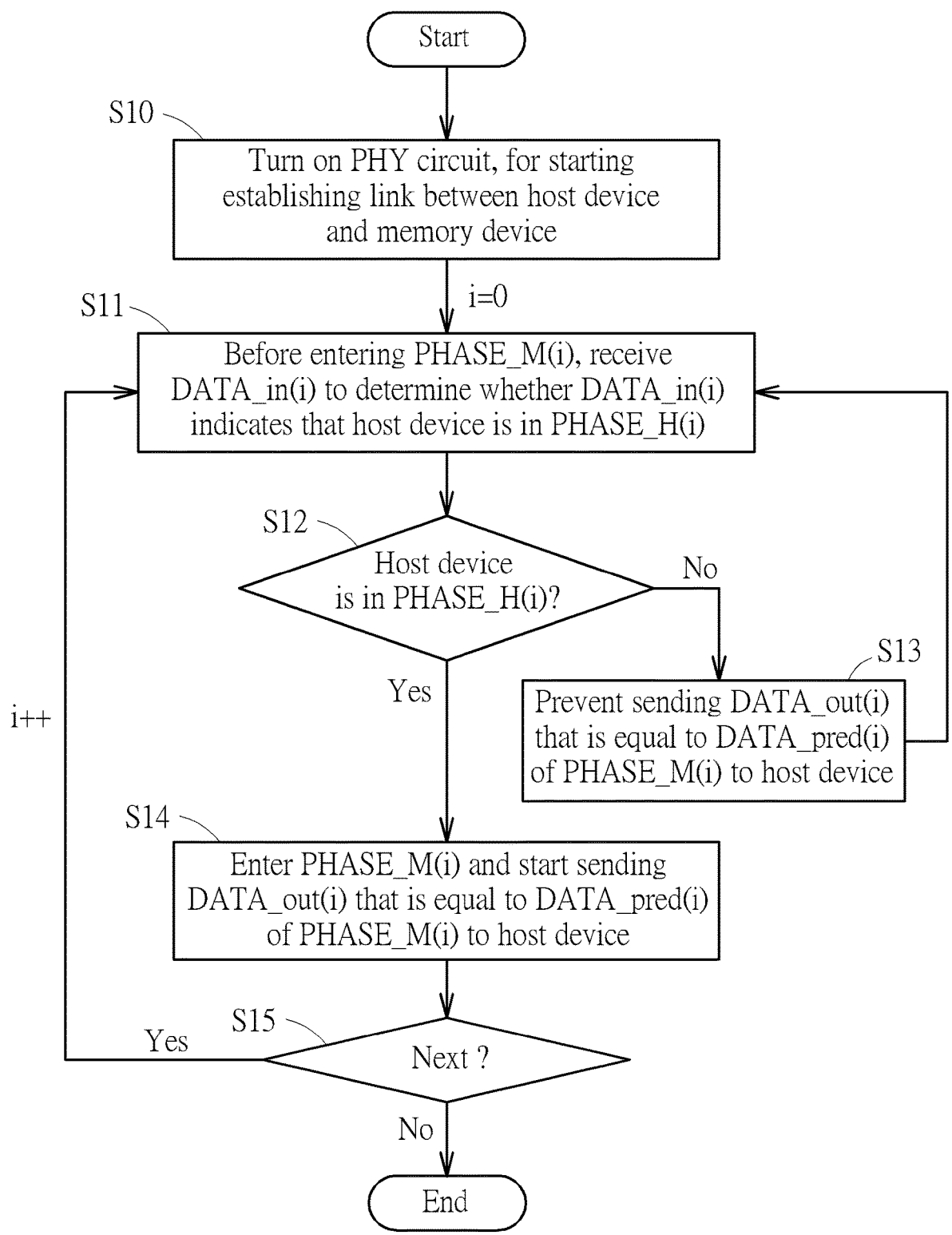
FIG. 10 illustrates a working flow of the method for performing link management of the memory device in the predetermined communications architecture with aid of handshaking phase transition control according to an embodiment of the present invention.

FIG. 10 illustrates a working flow of the method for performing link management of the memory device in the predetermined communications architecture with aid of handshaking phase transition control according to an embodiment of the present invention. For example, the index i may be a non-negative integer, and more particularly, may have an initial value such as zero (labeled "i=0" for brevity), and may increase with a predetermined increment such as one (labeled "i++" for brevity).

In Step S10, the memory device 100 (e.g., the memory controller 110) can utilize the aforementioned at least one upper layer controller such as the upper layer controller 118U to turn on the M-PHY circuit 118M, for starting establishing the link between the host device 50 and the memory device 100.

In Step S11, before entering the handshaking phase PHASE_M(i) among the handshaking phases {PHASE=0, 1, 2, . . . } (e.g., the handshaking phases PMU0, PMU1, PMU2, PMC and PMA), the memory device 100 (e.g., the memory controller 110) can utilize the M-PHY circuit 118M to receive any incoming data DATA_in(i) sent from the host device 50 to determine whether the aforementioned any incoming data DATA_in(i) indicates that the host device 50 is in the corresponding handshaking phase PHASE_H(i) among the handshaking phases {PHASE_H(i) i=0, 1, 2, . . . } (e.g., the handshaking phases PHU0, PHU1, PHU2, PHC and PHA).

In Step S12, the memory device 100 (e.g., the memory controller 110) can check whether the host device 50 is in the corresponding handshaking phase PHASE_H(i) according to whether the aforementioned any incoming data DATA_in (i) is equal to the corresponding predetermined data (e.g., the corresponding predetermined data among the predetermined data {UPR0, UPR1, UPR2, CAP, AFC} generated at the host side) of the corresponding handshaking phase PHASE_H(i), such as the corresponding predetermined data generated in the corresponding handshaking phase PHASE_H(i) at the host side. If Yes, Step S14 is entered; if No, Step S13 is entered.

In Step S13, the memory device 100 (e.g., the memory controller 110) can prevent sending any outgoing data DATA_out(i) that is equal to the predetermined data DATA_pred(i) (e.g., the $i^{th}$ type of predetermined data among the predetermined data {UPR0, UPR1, UPR2, CAP, AFC} generated at the device side) of the handshaking phase PHASE_M(i) to the host device 50 before detecting that the host device 50 is in the corresponding handshaking phase PHASE_H(i).

In Step S14, in response to the aforementioned any incoming data DATA_in(i) indicating that the host device 50 is in the corresponding handshaking phase PHASE_H(i), the memory device 100 (e.g., the memory controller 110) can enter the handshaking phase PHASE_M(i) and start sending the outgoing data DATA_out(i) that is equal to the predetermined data DATA_pred(i) of the handshaking phase PHASE_M(i) to the host device 50.

In Step S15, the memory device 100 (e.g., the memory controller 110) can check whether a next handshaking phase PHASE_M(i+1) exists, for example, according to whether the handshaking operation of the last handshaking phase (e.g., the handshaking phase PHASE_M(4) such as the handshaking phase PMA) among the handshaking phases {PHASE_H(i)|i=0, 1, 2, . . . } has not been performed. If Yes, Step S11 is entered; if No, the working flow shown in FIG. comes to the end.

According to the method, the memory device 100 (e.g., the memory controller 110) can control the handshaking phases {PHASE_M(i)|i=0, 1, 2, . . . } (e.g., the handshaking phases PMU0, PMU1, PMU2, PMC and PMA at the device side) according to the handshaking phases {PHASE_H(i) |i=0, 1, 2, . . . } (e.g., the handshaking phases PHU0, PHU1, PHU2, PHC and PHA at the host side), respectively, in order to make a handshaking phase transition between two consecutive handshaking phases among the handshaking phases {PHASE_M(i)|i=0, 1, 2, . . . } at the device side come after a corresponding handshaking phase transition between two corresponding consecutive handshaking phases among the handshaking phases {PHASE_H(i)|i=1, 2, . . . } at the host side. As a result, the beginning time point of the handshaking phase transition between the two consecutive handshaking phases among the handshaking phases {PHASE_M(i)|i=0, 1, 2, . . . } at the device side may be almost equal to (e.g., slightly later than) the beginning time point of the corresponding handshaking phase transition between the two corresponding consecutive handshaking phases among the handshaking phases {PHASE_H(i)|i=1, 2, . . . } at the host side. Therefore, the present invention method and apparatus can prevent any handshaking operation for establishing the link from getting stuck, and therefore can guarantee the establishment of the link between the host device 50 and the memory device 100 to be successful. For brevity, similar descriptions for this embodiment are not repeated in detail here.

For better comprehension, the method may be illustrated with the working flow shown in FIG. 10, but the present invention is not limited thereto. According to some embodiments, one or more steps may be added, deleted, or changed in the working flow shown in FIG. 10.

According to some embodiments, the first handshaking phase mentioned above may represent one of the handshaking phase PMC and PMA, rather than the handshaking phase PMU1, where the first predetermined data may represent one of the predetermined data CAP and ACP generated at the device side, rather than the predetermined data UPR1 generated at the device side. The multiple handshaking phases of the handshaking procedure of the memory device 100 may comprise the first handshaking phase, and further comprise multiple preceding handshaking phases (e.g., the handshaking phases PMU0, PMU1 and PMU2) prior to the first handshaking phase. For example, the associated operations may comprise:

(1) during a first preceding handshaking phase (e.g., the handshaking phase PMU1) among the multiple preceding handshaking phase, the memory controller 110 can utilize the M-PHY circuit 118M to communicate with the host device 50 to exchange first preceding outgoing data and first preceding incoming data, where the first preceding outgoing data is equal to first preceding predetermined data (e.g., the predetermined data UPR1 generated at the device side) of the first preceding handshaking phase, and the first preceding incoming data is equal to corresponding first preceding predetermined data (e.g., the predetermined data UPR1 generated at the host side) of a corresponding first preceding handshaking phase (e.g., handshaking phase PHU1) at the host device 50; and (2) during a second preceding handshaking phase (e.g., the handshaking phase PMU2) among the multiple preceding handshaking phase, the second preceding handshaking phase posterior to the first second preceding handshaking phase, the memory controller 110 can utilize the M-PHY circuit 118M to communicate with the host device 50 to exchange second preceding outgoing data and second preceding incoming data, where the second preceding outgoing data is equal to second preceding predetermined data (e.g., the predetermined data UPR2 generated at the device side) of the second preceding handshaking phase, and the second preceding incoming data is equal to corresponding second preceding predetermined data (e.g., the predetermined data UPR2 generated at the host side) of a corresponding second preceding handshaking phase (e.g., handshaking phase PHU2) at the host device 50;

but the present invention is not limited thereto. For example, the first predetermined data may represent the predetermined data CAP generated at the device side, such as the capability data for indicating the aforementioned at least one capability parameter of the memory device 100, and the M-PHY circuit 118M may send the first outgoing data that is equal to the predetermined data CAP generated at the device side to the host device 50, for notifying the host device 50 of the aforementioned at least one capability parameter of the memory device 100. For another example, the first predetermined data may represent the predetermined data AFC generated at the device side, such as the flow credit data for indicating the aforementioned at least one flow credit of the memory device 100, and the M-PHY circuit 118M may send the first outgoing data that is equal to the predetermined data AFC generated at the device side to the host device 50, for notifying the host device 50 of the aforementioned at least one flow credit of the memory device 100, such as the data buffer size of the memory device 100. For brevity, similar descriptions for these embodiments are not repeated in detail here.

According to some embodiments, the parameter Creq carried by the predetermined data AFC generated at the device side can be equal to one (e.g., Creq=1). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing link management of a memory device in a predetermined communications architecture with aid of handshaking phase transition control, the method being applied to a memory controller of the memory device, the memory device comprising the memory controller and a non-volatile (NV) memory, the NV memory comprising at least one NV memory element, the method comprising:

utilizing at least one upper layer controller of a transmission interface circuit within the memory controller to turn on a physical layer (PHY) circuit of the transmission interface circuit, for starting establishing a link between a host device and the memory device;

before entering a first handshaking phase of a handshaking procedure of the memory device, the handshaking procedure for establishing the link between the host device and the memory device, utilizing the PHY circuit to receive any first incoming data sent from the host device to determine whether the any first incoming data indicates that the host device is in a corresponding first handshaking phase, and prevent sending any outgoing data that is equal to first predetermined data of the first handshaking phase to the host device before detecting that the host device is in the corresponding first handshaking phase, wherein the first handshaking phase is not earliest among multiple handshaking phases of the handshaking procedure; and in response to the any first incoming data indicating that the host device is in the corresponding first handshaking phase, utilizing the PHY circuit to send first outgoing data that is equal to the first predetermined data to the host device.

2. The method of claim 1, wherein the multiple handshaking phases of the handshaking procedure comprises the first handshaking phase, and further comprises a preceding handshaking phase prior to the first handshaking phase; and the method further comprises:

during the preceding handshaking phase, utilizing the PHY circuit to communicate with the host device to exchange preceding outgoing data and preceding incoming data, wherein the preceding outgoing data is equal to preceding predetermined data of the preceding handshaking phase, and the preceding incoming data is equal to corresponding preceding predetermined data of a corresponding preceding handshaking phase at the host device.

3. The method of claim 1, further comprising:

before entering a preceding handshaking phase of the handshaking procedure of the memory device, the preceding handshaking phase prior to the first handshaking phase, utilizing the PHY circuit to receive any preceding incoming data sent from the host device to determine whether the any preceding incoming data indicates that the host device is in a corresponding preceding handshaking phase, and prevent sending any outgoing data that is equal to preceding predetermined data of the preceding handshaking phase to the host device before detecting that the host device is in the corresponding preceding handshaking phase; and in response to the any preceding incoming data indicating that the host device is in the corresponding preceding handshaking phase, utilizing the PHY circuit to send preceding outgoing data that is equal to the preceding predetermined data to the host device.

4. The method of claim 1, further comprising:
during a preceding handshaking phase of the handshaking procedure of the memory device, the preceding handshaking phase prior to the first handshaking phase, utilizing the PHY circuit to send preceding outgoing data that is equal to preceding predetermined data of the preceding handshaking phase to the host device, no matter whether any preceding incoming data indicating that the host device is in a corresponding preceding handshaking phase is received from the host device in advance.

5. The method of claim 1, further comprising:
before entering a second handshaking phase of the handshaking procedure of the memory device, the second handshaking phase posterior to the first handshaking phase, utilizing the PHY circuit to receive any second incoming data sent from the host device to determine whether the any second incoming data indicates that the host device is in a corresponding second handshaking phase, and prevent sending any outgoing data that is equal to second predetermined data of the second handshaking phase to the host device before detecting that the host device is in the corresponding second handshaking phase; and in response to the any second incoming data indicating that the host device is in the corresponding second handshaking phase, utilizing the PHY circuit to send second outgoing data that is equal to the second predetermined data to the host device.

6. The method of claim 5, further comprising:
before entering a subsequent handshaking phase of the handshaking procedure of the memory device, the subsequent handshaking phase posterior to the second handshaking phase, utilizing the PHY circuit to receive any subsequent incoming data sent from the host device to determine whether the any subsequent incoming data indicates that the host device is in a corresponding subsequent handshaking phase, and prevent sending any outgoing data that is equal to subsequent predetermined data of the subsequent handshaking phase to the host device before detecting that the host device is in the corresponding subsequent handshaking phase; and in response to the any subsequent incoming data indicating that the host device is in the corresponding subsequent handshaking phase, utilizing the PHY circuit to send subsequent outgoing data that is equal to the subsequent predetermined data to the host device.

7. The method of claim 6, wherein the subsequent predetermined data represents capability data for indicating at least one capability parameter of the memory device, and the PHY circuit sends the subsequent outgoing data that is equal to the subsequent predetermined data to the host device, for notifying the host device of the at least one capability parameter.

8. The method of claim 6, wherein the subsequent predetermined data represents flow credit data for indicating at least one flow credit of the memory device, and the PHY circuit sends the subsequent outgoing data that is equal to the subsequent predetermined data to the host device, for notifying the host device of the at least one flow credit.

9. The method of claim 8, wherein the at least one flow credit comprises a data buffer size of the memory device.

10. The method of claim 1, wherein the multiple handshaking phases of the handshaking procedure comprises the first handshaking phase, and further comprises multiple preceding handshaking phases prior to the first handshaking phase.

11. The method of claim 10, further comprising:
during a first preceding handshaking phase among the multiple preceding handshaking phase, utilizing the PHY circuit to communicate with the host device to exchange first preceding outgoing data and first preceding incoming data, wherein the first preceding outgoing data is equal to first preceding predetermined data of the first preceding handshaking phase, and the first preceding incoming data is equal to corresponding first preceding predetermined data of a corresponding first preceding handshaking phase at the host device.

12. The method of claim 11, further comprising:
during a second preceding handshaking phase among the multiple preceding handshaking phase, the second preceding handshaking phase posterior to the first second preceding handshaking phase, utilizing the PHY circuit to communicate with the host device to exchange second preceding outgoing data and second preceding incoming data, wherein the second preceding outgoing data is equal to second preceding predetermined data of the second preceding handshaking phase, and the second preceding incoming data is equal to corresponding second preceding predetermined data of a corresponding second preceding handshaking phase at the host device.

13. The method of claim 10, the first predetermined data represents capability data for indicating at least one capability parameter of the memory device, and the PHY circuit sends the first outgoing data that is equal to the first predetermined data to the host device, for notifying the host device of the at least one capability parameter.

14. The method of claim 10, wherein the first predetermined data represents flow credit data for indicating at least one flow credit of the memory device, and the PHY circuit sends the first outgoing data that is equal to the first predetermined data to the host device, for notifying the host device of the at least one flow credit.

15. The method of claim 14, wherein the at least one flow credit comprises a data buffer size of the memory device.

16. A memory device, comprising:
a non-volatile (NV) memory, arranged to store information, wherein the NV memory comprises at least one NV memory element; and
a memory controller, coupled to the NV memory, arranged to control operations of the memory device, wherein the memory controller comprises:
a processing circuit, arranged to control the memory controller according to a plurality of host commands from a host device, to allow the host device to access the NV memory through the memory controller; and a transmission interface circuit, arranged to perform communications with the host device, wherein the transmission interface circuit comprises:
    a physical layer (PHY) circuit, arranged to perform transmitting and receiving operations for the transmission interface circuit; and
    at least one upper layer controller, arranged to control operations of the PHY circuit according to a predetermined specification;
wherein:
  the memory controller utilizes the at least one upper layer controller to turn on the PHY circuit, for starting establishing a link between the host device and the memory device;
  before entering a first handshaking phase of a handshaking procedure of the memory device, the handshaking procedure for establishing the link between the host device and the memory device, the memory controller utilizes the PHY circuit to receive any first incoming data sent from the host device to determine whether the any first incoming data indicates that the host device is in a corresponding first handshaking phase, and prevent sending any outgoing data that is equal to first predetermined data of the first handshaking phase to the host device before detecting that the host device is in the corresponding first handshaking phase, wherein the first handshaking phase is not earliest among multiple handshaking phases of the handshaking procedure; and
  in response to the any first incoming data indicating that the host device is in the corresponding first handshaking phase, the memory controller utilizes the PHY circuit to send first outgoing data that is equal to the first predetermined data to the host device.

17. An electronic device comprising the memory device of claim 16, and further comprising:
  the host device, coupled to the memory device, wherein the host device comprises:
    at least one processor, arranged for controlling operations of the host device; and
    a power supply circuit, coupled to the at least one processor, arranged for providing power to the at least one processor and the memory device;
  wherein the memory device provides the host device with storage space.

18. A memory controller of a memory device, the memory device comprising the memory controller and a non-volatile (NV) memory, the NV memory comprising at least one NV memory element, the memory controller comprising:
  a processing circuit, arranged to control the memory controller according to a plurality of host commands from a host device, to allow the host device to access the NV memory through the memory controller; and
  a transmission interface circuit, arranged to perform communications with the host device, wherein the transmission interface circuit comprises:
    a physical layer (PHY) circuit, arranged to perform transmitting and receiving operations for the transmission interface circuit; and
    at least one upper layer controller arranged to control operations of the PHY circuit according to a predetermined specification;
wherein:
  the memory controller utilizes the at least one upper layer controller to turn on the PHY circuit, for starting establishing a link between the host device and the memory device;
  before entering a first handshaking phase of a handshaking procedure of the memory device, the handshaking procedure for establishing the link between the host device and the memory device, the memory controller utilizes the PHY circuit to receive any first incoming data sent from the host device to determine whether the any first incoming data indicates that the host device is in a corresponding first handshaking phase, and prevent sending any outgoing data that is equal to first predetermined data of the first handshaking phase to the host device before detecting that the host device is in the corresponding first handshaking phase, wherein the first handshaking phase is not earliest among multiple handshaking phases of the handshaking procedure; and
  in response to the any first incoming data indicating that the host device is in the corresponding first handshaking phase, the memory controller utilizes the PHY circuit to send first outgoing data that is equal to the first predetermined data to the host device.

\* \* \* \* \*